United States Patent
Nagino

(10) Patent No.: US 12,249,830 B2
(45) Date of Patent: Mar. 11, 2025

(54) PLANNING APPARATUS, CONTROLLING APPARATUS, METHOD, AND RECORDING MEDIUM FOR A HYDROGEN PRODUCTION SYSTEM

(71) Applicant: ASAHI KASEI KABUSHIKI KAISHA, Tokyo (JP)

(72) Inventor: Goshu Nagino, Tokyo (JP)

(73) Assignee: ASAHI KASEI KABUSHIKI KAISHA, Tokyo (JP)

( * ) Notice: Subject to any disclaimer, the term of this patent is extended or adjusted under 35 U.S.C. 154(b) by 855 days.

(21) Appl. No.: 17/464,700

(22) Filed: Sep. 2, 2021

(65) Prior Publication Data

US 2021/0399575 A1    Dec. 23, 2021

Related U.S. Application Data

(63) Continuation of application No. PCT/JP2020/009276, filed on Mar. 4, 2020.

(30) Foreign Application Priority Data

Mar. 4, 2019    (JP) .................................. 2019-038556

(51) Int. Cl.
*H02J 15/00*    (2006.01)
*G05B 15/02*    (2006.01)
*G06N 20/00*    (2019.01)
*H02J 3/00*    (2006.01)

(52) U.S. Cl.
CPC ............ *H02J 15/008* (2020.01); *G05B 15/02* (2013.01); *G06N 20/00* (2019.01); *H02J 3/003* (2020.01); *H02J 2203/20* (2020.01)

(58) Field of Classification Search
None
See application file for complete search history.

(56) References Cited

U.S. PATENT DOCUMENTS

| | | |
|---|---|---|
| 2003/0182250 A1 | 9/2003 | Shihidehpour |
| 2004/0131508 A1 | 7/2004 | Fairlie |
| 2005/0165511 A1 | 7/2005 | Fairlie |
| 2010/0152900 A1 | 6/2010 | Gurciullo |

(Continued)

FOREIGN PATENT DOCUMENTS

| | | |
|---|---|---|
| CN | 102592037 A | 7/2012 |
| JP | 2003216697 A | 7/2003 |

(Continued)

OTHER PUBLICATIONS

Extended European Search Report for European Patent Application No. 20767375.7, issued by the European Patent Office on Apr. 7, 2022.

(Continued)

*Primary Examiner* — Mohammad Ali
*Assistant Examiner* — Saad M Kabir

(57) ABSTRACT

The present invention provides a planning apparatus for creating an operation plan for a hydrogen production system including a hydrogen generation apparatus, comprising: an acquisition portion for acquiring a demand response from a power operator; and an operation planning portion for creating the operation plan based on the demand response before a target period of the operation plan and at least one of a electricity price, a demand amount of hydrogen and an amount of stored hydrogen before the target period.

19 Claims, 7 Drawing Sheets

(56) References Cited

U.S. PATENT DOCUMENTS

| | | |
|---|---|---|
| 2012/0072040 A1 | 3/2012 | Kaji |
| 2013/0317959 A1 | 11/2013 | Joos |
| 2016/0028236 A1 | 1/2016 | Lansing, Jr. |
| 2017/0161849 A1 | 6/2017 | Seki |
| 2017/0317502 A1 | 11/2017 | Akira |
| 2018/0262003 A1 | 9/2018 | Yabe |
| 2019/0279239 A1 | 9/2019 | Ikemoto |

FOREIGN PATENT DOCUMENTS

| | | |
|---|---|---|
| JP | 2016170594 A | 9/2016 |
| JP | 2017009069 A | 1/2017 |
| JP | 2017034843 A | 2/2017 |
| JP | 2018172748 A | 11/2018 |
| JP | 2018207745 A | 12/2018 |
| WO | 2017130280 A1 | 8/2017 |
| WO | 2018078875 A1 | 5/2018 |

OTHER PUBLICATIONS

International Preliminary Report on Patentability for International Application No. PCT/JP2020/009276, issued by the International Bureau of WIPO on Aug. 25, 2021.

New Energy and Industrial Technology Development Organization, "FY2016 Annual Report, Technology Development for the Realization of the Hydrogen Society/Technology Development of Systems Using Renewable Energy-Derived Hydrogen/Business Model Development, and Large Scale Demonstration of a Renewable and Hydrogen Energy System Capable of Supporting the Future Hydrogen Society", Jul. 13, 2018, report management No. 20180000000419, project No. P14026, p. 1, line 33 to p. 3, line 48.

PLANNING APPARATUS, CONTROLLING APPARATUS, METHOD, AND RECORDING MEDIUM FOR A HYDROGEN PRODUCTION SYSTEM

The contents of the following Japanese patent application(s) are incorporated herein by reference:
2019-038556 filed in JP on Mar. 4, 2019; and
PCT/JP2020/009276 filed in WO on Mar. 4, 2020.

BACKGROUND

1. Technical Field

This invention relates to a planning apparatus, a control apparatus, a hydrogen production system, a method and a recording medium.

2. Related Art

Conventionally, a hydrogen generation apparatus for creating hydrogen by means of electrolyzing water is known. In addition, an institution called "demand response" exists, which is for facilitating usage inhibition or usage increase of power for the purpose of intending stable power supply.

DESCRIPTION OF EXEMPLARY EMBODIMENTS

Hereafter, the present invention will be explained through the embodiment of the invention, however, the following embodiment does not necessarily limit the inventions according to the scopes of the claims. In addition, not all the combinations of the features explained in the embodiment are necessarily essential for the means for solving the problems of the invention.

Figure 1:
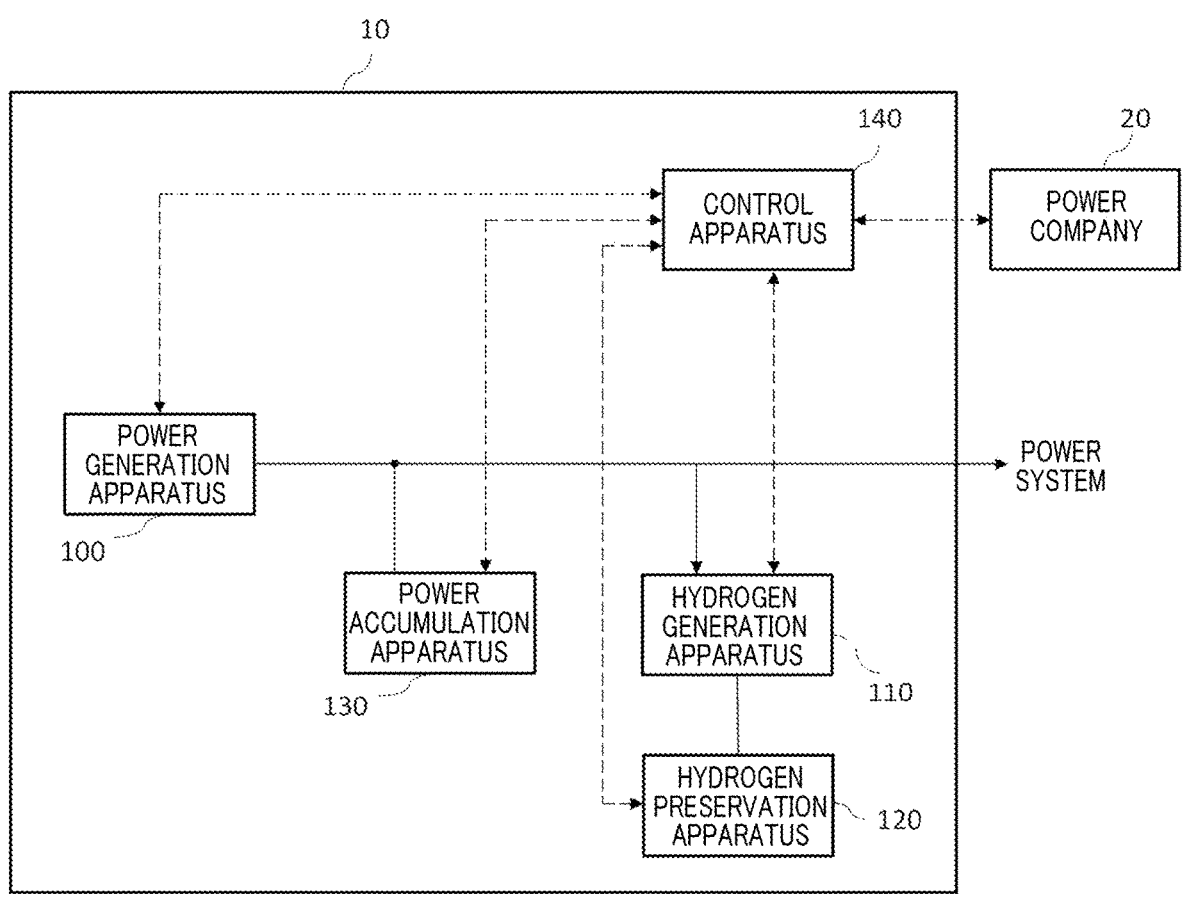
FIG. 1 shows the arrangement of the hydrogen production system 10 according to this embodiment.

FIG. 1 shows the arrangement of the hydrogen production system 10 according to this embodiment. The hydrogen production system 10 creates an operation plan with which the hydrogen can be produced so as to satisfy the hydrogen demand, taking the demand response from a power operator 20 into account, to accordingly operate the hydrogen generation apparatus 110 following the operation plan.

Here, the power operator 20 may be an operator who supplies the power via the power grid of the power system, or an operator who conducts a business related to the power. In addition, the demand response may be either of a command to request an increase of the power consumption amount or a command to request an inhibition of the power consumption amount, to the demanders of the power, including the hydrogen production system 10. The demand response may be the one that shows the degree of increase or inhibition of the requested power consumption amount (as an example, proportion of increase or inhibition). The demand response may be the one that gives an incentive such as points or a discount of the electricity price to the demanders who has followed the requests, or the one that fluctuates the electricity price by each time zone.

The hydrogen production system 10 comprises a power generation apparatus 100, a hydrogen generation apparatus 110, a hydrogen preservation apparatus 120, a power storage apparatus 130 and a control apparatus 140.

The power generation apparatus 100 is electrically connected to the hydrogen generation apparatus 110 and the power storage apparatus 130 via the power grid of the power system, or not via the power grid. The power generation apparatus 100 creates power (the unit is Watt, as an example) using a renewable energy, for example, the wind power or the sunlight, etc. The power generation apparatus 100 supplies the power to the hydrogen generation apparatus 110, and supplies the surplus power to the power storage apparatus 130 to accumulate the power. Furthermore, the power generation apparatus 100 may sell the surplus power to the power system.

The hydrogen generation apparatus 110 is connected to the hydrogen preservation apparatus 120, the power storage apparatus 130 and the power system. The hydrogen generation apparatus 110 outputs the hydrogen associated with the hydrogen generation amount (the unit is normal cubic meter/hour, which is also described as "Nm3/hour", as an example) associated with the magnitude of the supplied power to the hydrogen preservation apparatus 120. The hydrogen generation apparatus 110 is supplied with power from at least one of the power generation apparatus 100, the power storage apparatus 130 and the power system.

The hydrogen preservation apparatus 120 receives and preserves the hydrogen generated by the hydrogen generation apparatus 110, and supplies the hydrogen associated with the hydrogen demand amount Uh (the unit is Nm3/hour, as an example) associated with the requirement by the demander of the hydrogen to the demander.

The power storage apparatus 130 is connected to the power system. The power storage apparatus 130 accumulates at least a part of the surplus power not used by the hydrogen generation apparatus 110 among the power created by the power generation apparatus 100, and thereafter makes it capable of supplying the power to the hydrogen generation apparatus 110. The power storage apparatus 130 may accumulate the power from the power system.

The control apparatus 140 is communicably connected to the power generation apparatus 100, the hydrogen generation apparatus 110, the hydrogen preservation apparatus 120, the power storage apparatus 130 and the power operator 20. The control apparatus 140 acquires and monitors the operation state of each apparatus of the hydrogen production system 10, and controls input and/or output of each apparatus by means of communicating with each apparatus. Furthermore, the control apparatus 140 may transmit various kinds of data to a terminal apparatus, etc. of the administrator or the maintenance worker of each apparatus of the hydrogen production system 10 to have the administrator or the like maintain or control each apparatus. The control apparatus 140 acquires the demand response issued by the power operator 20.

Figure 2:
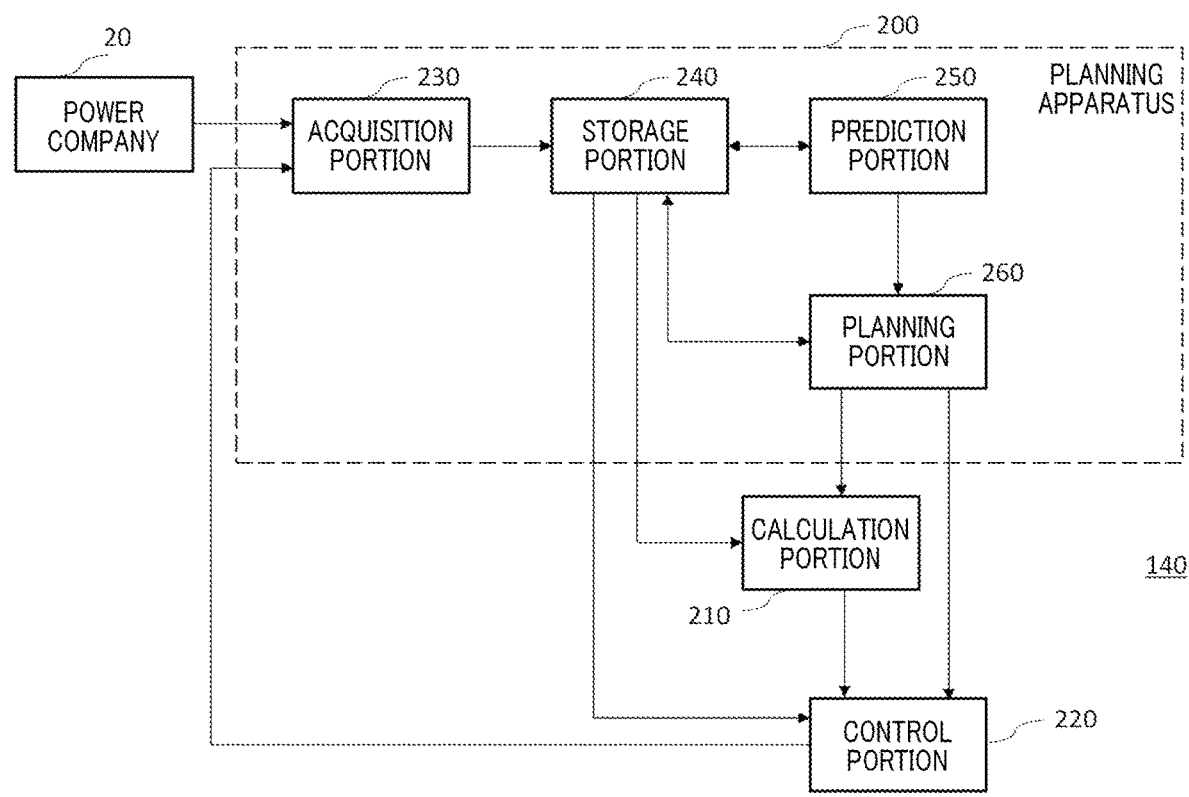
FIG. 2 shows the arrangement of the control apparatus 140 of this embodiment.

FIG. 2 shows the arrangement of the control apparatus 140 of this embodiment. The control apparatus 140 has a planning apparatus 200, a calculation portion 210 and a control portion 220.

The planning apparatus 200 is connected to the calculation portion 210 and the control portion 220, and creates to output the maintenance plan and the operation plan associated with the demand response from the power operator 20 and the operation state of the hydrogen production system 10.

The planning apparatus 200 may be a personal computer, a tablet-type computer, a smartphone, a work station, a sever computer or a computer such as a general purpose computer, or may be a computer system to which multiple computers are connected. The planning apparatus 200 may create a plan and the like by means of processing in a CPU, GPU (Graphics Processing Unit) and/or TPU (Tensor Processing Unit) of a computer. Furthermore, the planning apparatus 200 may be the one that runs various kinds of processing on a cloud provided by a server computer. The planning apparatus 200 has an acquisition portion 230, a storage portion 240, a prediction portion 250 and a planning portion 260.

The acquisition portion 230 is connected to the control portion 220 and the storage portion 240, and acquires the demand response from the power operator 20 The acquisition portion 230 may acquire the data related to the operation state of the hydrogen production system 10 collected by the control portion 220. The acquisition portion 230 may acquire to update information by each predefined period. The acquisition portion 230 may acquire information by each substantially same or different period in accordance with said information to be acquired, to add or update it respectively. Furthermore, the acquisition portion 230 may be connected to a network and the like to acquire the data via said network. The acquisition portion 230 may, if at least a part of the data to be acquired is stored in an external database, etc., access to said database, etc. to acquire it. Moreover, the acquisition portion 230 supplies various kinds of data such as the acquired demand response to the storage portion 240.

The storage portion 240 is connected to the prediction portion 250, the planning portion 260, the calculation portion 210 and the control portion 220, and stores the data supplied from the acquisition portion 230. The storage portion 240 may store the data to be processed by the planning apparatus 200. The storage portion 240 may store the intermediate data to be calculated or used in course of creation of a plan by the planning apparatus 200, the calculation result, and parameter, etc., respectively. Furthermore, the storage portion 240 may supply the stored data to a requestor, in response to a requirement by each arrangement in the planning apparatus 200.

The prediction portion 250 is connected to the planning portion 260 to receive data such as a predictive factor or a performance, etc. from the storage portion 240. The prediction portion 250 creates, from the predictive factor and the performance, etc., the predicted result including at least one of the predicted demand response, the predicted operation amount, the predicted demand amount, the predicted consumption amount, the predicted power generation amount, the predicted electricity price, the predicted preservation amount, the predicted power storage amount and the abnormality prediction. The prediction portion 250 creates one or more leaning models to update said learning model (as an example, learning with a tutor). The prediction portion 250 creates the predicted result based on the updated learning model. The prediction portion 250 supplies the predicted result to the storage portion 240 and/or the planning portion 260.

Here, the predicted demand response may include at least one of whether which of the presence/absence of issuance of a demand response, the timing of issuance, the inhibition and increase of the power consumption amount (as an example, the unit is Watt) by the power operator 20 the demand response is requesting, the degree of inhibition of the power consumption amount, the degree of increase that are requested, and the electricity price, in the future target period.

The predicted operation amount may include the operation amount of the hydrogen generation apparatus 110 (for example, the operation rate, the operation period, the aggregation of the hydrogen creation amount, or the hydrogen creation amount of the hydrogen generation apparatus 110 per unit hour, etc.) in the future target period. The predicted demand amount may include at least one of the aggregation of the demand amount, and the demand amount per hour, per day or per month, of the hydrogen, in the future target period. The predicted consumption amount may include at least one of the aggregation of the consumption amount of the hydrogen, and the consumption amount of the hydrogen per hour, per day or per month in the future target period.

Here, the demand amount of the hydrogen may be the amount of the hydrogen associated with a requirement from a demander (for example, a customer and the like who buys the hydrogen created by the hydrogen generation apparatus 110) to the hydrogen production system 10 (for example, the hydrogen created by the hydrogen generation apparatus 110). For example, the demand amount of the hydrogen may be the demand amount of the hydrogen of which the predefined buffer amount is added to the supply amount of the hydrogen to the demander of the hydrogen, in order that the preservation amount in the hydrogen preservation apparatus 120 of the hydrogen production system 10 should not be zero. Moreover, the consumption amount of the hydrogen is not limited to the hydrogen created by the hydrogen production system 10, rather, it may be the amount of the hydrogen to be consumed by the demander. For example, the consumption amount of the hydrogen is the consumption amount of the hydrogen in one or more regions (for example, a municipality, a prefecture, a nation and the like), or the consumption amount of the hydrogen in one or more companies.

The predicted power generation amount may include at least one of the aggregation of the power generation amount, and the power generation amount per hour, per day or per month, of the power generation apparatus 100, in the future target period. The predicted electricity price may be the price of the power to be supplied at each time zone (selling price of the power or buying price of the power) from the power system via the power grid (or from the power operator 20), in the future target period.

The predicted preservation amount may include the preservation amount of the hydrogen in the hydrogen preservation apparatus 120, which preserves the hydrogen created by the hydrogen generation apparatus 110 (for example, the preservation amount per hour, per day or per month, proportion against the maximum preservable amount, etc.), in the future target period. The predicted power storage amount may include at least one of the aggregation of the power storage amount of the power storage apparatus 130, and the power storage amount per hour, per day or per month, in the future target period. The abnormality prediction may include lowering of the creation efficiency of the hydrogen (for example, the hydrogen creation amount per unit power or per unit hour) by the hydrogen generation apparatus 110, or presence/absence of abnormal behavior such as a failure of the apparatus, timing of occurrence or the content of the abnormal behavior, in the hydrogen production system 10, in the future target period.

The planning portion 260 is connected to the calculation portion 210 and the control portion 220, and creates to output the planning data including at least one of the operation plan and the maintenance plan. The planning portion 260 creates one or more leaning models and updates said learning model by reinforcement learning, and creates the planning data based on the updated learning model. The planning portion 260 supplies the created planning data to the storage portion 240, the calculation portion 210 and the control portion 220.

Here, the operation plan may include a plan which specifies at least one of the operation amount (for example, the operation rate or the hydrogen creation amount, etc.), the operation period, and the operation time zone, of the hydrogen generation apparatus 110, in the future target period. The maintenance plan includes a future plan in which a maintenance work is done for at least one apparatus of the hydrogen production system 10. The maintenance plan is to plan, for example, at least one of whether a maintenance work of the apparatus of the hydrogen production system 10 is to be done or not, the timing of the maintenance work, the content of the maintenance work, the apparatus to be used in the maintenance work, the number of persons who do the maintenance work, the skill, the performance, and the positioning, in the target period. Note that, the maintenance work may include at least one of the maintenance of an apparatus or its component (for example, servicing, inspection, and keeping, etc.) and replacement.

The calculation portion 210 is connected to the control portion 220, receives the demand response acquired in the acquisition portion 230 from the storage portion 240, and calculates the profit to be obtained by regulating the operation amount of the hydrogen generation apparatus 110 following said demand response. The calculation portion 210 may further receive the operation plan that is currently being practiced from the planning portion 260, to accordingly calculate the profit. The calculation portion 210 may further receive the current operation state and the like of the hydrogen generation apparatus 110 from the storage portion 240, to accordingly calculate the profit. The calculation portion 210 supplies the calculated profit to the control portion 220.

The control portion 220 may be communicably connected to each apparatus of the hydrogen production system 10. The control portion 220 may control each apparatus of the hydrogen production system 10, in order that the hydrogen generation apparatus 110 is operated following the operation plan created in the planning portion 260. Moreover, the control portion 220 may transmit the planning data created in the planning portion 260 to the hydrogen production system 10, or to the operator of said hydrogen production system 10 or the terminal apparatus and the like held by the worker who conducts the maintenance work. The control portion 220 may collect data indicating the operation state and the like of each apparatus of the hydrogen production system 10 from each apparatus of the hydrogen production system 10 or an external apparatus, etc., to accordingly transmit to the acquisition portion 230.

According to the control apparatus 140 according to this embodiment as described above, hydrogen can be produced at low cost, by means of creating an operation plan, which takes the profit by following the demand response into account, and operating the hydrogen generation apparatus 110 following said operation plan.

Figure 3:
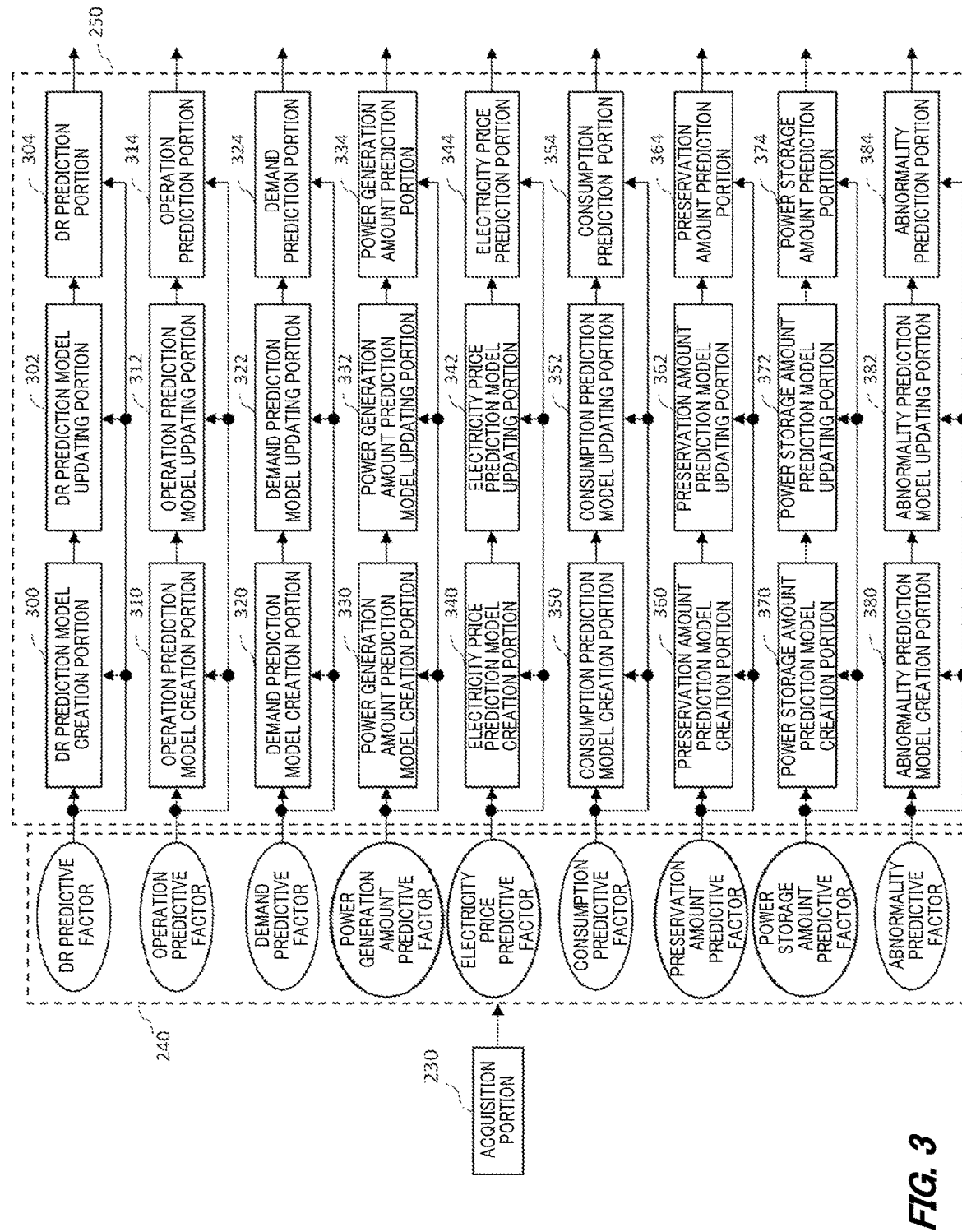
FIG. 3 shows the detailed arrangement of the prediction portion 250 of the planning apparatus 200 of this embodiment.

FIG. 3 shows the detailed arrangement of the prediction portion 250 of the planning apparatus 200 of this embodiment. The prediction portion 250 has a demand response prediction model creation portion 300, a demand response prediction model updating portion 302 and a demand response prediction portion 304, to create a predicted demand response for the hydrogen production system 10. The prediction portion 250 has an operation prediction model creation portion 310, an operation prediction model updating portion 312 and an operation prediction portion 314, to create a predicted operation amount of the hydrogen generation apparatus 110. The prediction portion 250 has a demand prediction model creation portion 320, a demand prediction model updating portion 322 and a demand prediction portion 324, to create a predicted demand amount of the hydrogen for the hydrogen production system 10. The prediction portion 250 has a power generation amount prediction model creation portion 330, a power generation amount prediction model updating portion 332 and a power generation amount prediction portion 334, to create a predicted power generation amount of the power generation apparatus 100.

The prediction portion 250 has an electricity price prediction model creation portion 340, an electricity price prediction model updating portion 342 and a electricity price prediction portion 344, to create a predicted electricity price of the power supplied from the power system. The prediction portion 250 has a consumption prediction model creation portion 350, a consumption prediction model updating portion 352 and a consumption prediction portion 354, to create a predicted consumption amount of the hydrogen. The prediction portion 250 has a preservation amount prediction model creation portion 360, a preservation amount prediction model updating portion 362 and a preservation amount prediction portion 364, to create a predicted preservation amount of the hydrogen of the hydrogen preservation apparatus 120.

The prediction portion 250 has a power storage amount prediction model creation portion 370, a power storage amount prediction model updating portion 372 and a power storage amount prediction portion 374, to create a predicted power storage amount of the power storage apparatus 130. The prediction portion 250 has an abnormality prediction model creation portion 380, an abnormality prediction model updating portion 382 and an abnormality prediction portion 384, to predict an abnormality of the hydrogen production system 10.

Here, the storage portion 240 stores predictive factors including a demand response predictive factor, an operation predictive factor, a demand predictive factor, a power generation amount predictive factor, an electricity price predictive factor, a consumption predictive factor, a preservation amount predictive factor, a power storage amount predictive factor and an abnormality predictive factor.

The demand response predictive factor may include the information related to the demand response for the hydrogen production system 10. The demand response predictive factor includes, at least one of, the performance of the demand response (for example, the issue timing, issue frequency, issue content, issue condition and weather information at the time of issuance, etc. of the demand response issued in the past), the electricity price of the power system, the weather information, the power generation amount of the power generation apparatus 100, the power generation amount of the power operator 20, the demand amount of the hydrogen for the hydrogen production system 10, the consumption amount of the hydrogen, and the power demand amount for the power system (for example, the power operator 20), before the target period, the predicted power generation amount of the power generation apparatus 100, the predicted power generation amount of the power operator 20, the predicted demand amount of the hydrogen for the hydrogen production system 10, the predicted power demand amount for the power system (for example, the power operator 20), and the predicted weather information, in the target period. The demand response predictive factor may further include the information of the power operator 20 (as an example, type or scale of the power generation, etc.). Here, the weather information may be the information of the region where the hydrogen generation apparatus 110 is installed, and may include at least one of the wind speed, wind direction, sunny, rainy, snow, temperature, wave height and hours of daylight, etc.

The operation predictive factor may include the information related to the operation of the hydrogen generation apparatus 110. The operation predictive factor may include at least one of, the operation amount of the hydrogen generation apparatus 110, the preservation amount of the hydrogen in the hydrogen preservation apparatus 120, the demand amount of the hydrogen, the power generation amount of the power generation apparatus 100, and the creation efficiency rate of the hydrogen of the hydrogen generation apparatus 110 (for example, the creation amount, etc., of the hydrogen per unit power or per unit hour), in the target period. The operation predictive factor may further include at least one of the predicted demand amount, the predicted electricity price and the predicted power generation amount, in the target period. Furthermore, the operation predictive factor may include virtual data calculated from a physical model of the hydrogen generation apparatus 110.

The demand predictive factor may include the information related to the demand for the hydrogen produced by the hydrogen generation apparatus 110. The demand predictive factor may include, at least one of, the consumption amount of the hydrogen, the demand amount of the hydrogen, the number of demanders of the hydrogen and the weather information, before the target period, the predicted consumption amount of the hydrogen and the predicted operation amount of the hydrogen generation apparatus 110, and the predicted weather information, in the target period.

The power generation amount predictive factor may include the information related to the power generation amount of the power generation apparatus 100. The power generation amount predictive factor may include, at least one of, the power generation amount of the power generation apparatus 100 (for example, the aggregation of the power generation amount or the power generation efficiency, etc. in a predetermined period), the power supply amount of the power generation apparatus 100, the power amount bought or sold by the hydrogen production system 10, the electricity price, the weather information, the type of the power generation apparatus 100 (for example, the type of the renewable energy, etc. to be used for power generation), the usage period of the power generation apparatus 100, the power storage amount of the power storage apparatus 130 before the target period, the predicted weather information, the predicted electricity price in the prediction target period. Moreover, the power generation amount predictive factor may include virtual data calculated from the physical model of the power generation apparatus 100.

The electricity price predictive factor may include the information related to the price of the power from the power system (power buying price or power selling price). The electricity price predictive factor may include, at least one of, the electricity price, the power demand amount, the power supply amount, the weather information before the target period, the predicted weather information and the predicted power generation amount of the power generation apparatus 100 in the target period.

The consumption predictive factor may include the information related to the consumption of the hydrogen by the demander. The consumption predictive factor may include, the demand amount of the hydrogen for the hydrogen production system 10, the consumption amount of the hydrogen, the weather information, the price of the hydrogen, the factor related to the hydrogen usage amount by the demander before the target period, and the predicted demand amount of the hydrogen in the target period. Here, the factor related to the hydrogen usage amount by the demander may include, for example, at least one of, the number of demanders who buy the hydrogen produced by the hydrogen production system 10, and the type of demander (for example, an operator, etc. of the hydrogen station who supplies the hydrogen to fuel cell buses and the like).

The preservation amount predictive factor may include the information related to the preservation amount of the hydrogen of the hydrogen preservation apparatus 120. The preservation amount predictive factor may include, at least one of, the operation amount of the hydrogen generation apparatus 110, the supply amount of the hydrogen from the hydrogen generation apparatus 110 to the hydrogen preservation apparatus 120, the preservation amount of the hydrogen in the hydrogen preservation apparatus 120, the demand amount of the hydrogen, the transportable amount of the hydrogen by each hydrogen transportation means, the number of hydrogen supply from the hydrogen preservation apparatus 120 to the hydrogen transportation means, the date/time of hydrogen supply from the hydrogen preservation apparatus 120 to the hydrogen transportation means before the target period, the predicted operation amount of the hydrogen generation apparatus 110, the predicted demand amount of the hydrogen, and the predicted consumption amount of the hydrogen in the target period.

The power storage amount predictive factor may include the information related to the power storage amount of the power storage apparatus 130. The power storage amount predictive factor may include, at least one of, the power storage amount of the power storage apparatus 130, the power demand amount in the hydrogen production system 10, the power amount sold to or bought from the power system, the operation amount of the hydrogen generation apparatus 110, the power generation amount of the power generation apparatus 100, the demand amount of the hydrogen, the hydrogen preservation amount of the hydrogen preservation apparatus 120 before the target period, the predicted power generation amount of the power generation apparatus 100, the predicted demand amount of the hydrogen, the predicted operation amount of the hydrogen generation apparatus 110, the predicted preservation amount of the hydrogen preservation apparatus 120, and the predicted electricity price in the target period. The power storage predictive factor may further include at least one of the type of the power storage apparatus 130, the usage period, and the maximum receivable power. Furthermore, the power storage predictive factor may include virtual data calculated from the physical model of the power storage apparatus 130.

The abnormality predictive factor may include the information which affects on abnormality occurrence of the hydrogen production system 10. The abnormality predictive factor may include, at least one of, the operation state of each apparatus of the hydrogen production system 10, the timing of replacement of the component recommended by the component manufacturer of each apparatus of the hydrogen production system 10, the time of usage of the component, the time passed after mounting said component to the apparatus, etc. before the target period, the predicted operation amount, the predicted power generation amount, the predicted preservation amount, and the predicted power storage amount in the target period.

Here, the operation state may include at least one of the operation rate of each apparatus of the hydrogen production system 10, the history of abnormal behavior such as deterioration of each apparatus (for example, the time of occurrence of the abnormal behavior, the repairing period, the operation rate of the apparatus before and after the time of occurrence of the abnormal behavior, and the content of the abnormal behavior, etc.), the result of self-diagnosis obtained from the sensor or the like attached to the apparatus of the hydrogen production system 10, and the hydrogen creation efficiency of the hydrogen generation apparatus 110. Furthermore, the control apparatus 140 may acquire the prediction data for predicting an abnormal behavior of the apparatus from the outside, etc., for storage as the information of abnormality predictive factor, in the storage portion 240. In this case, the prediction data may be the one that predicts an occurrence of next abnormal behavior, for a period equivalent to the past period from the actual operation start of the apparatus to the occurrence of the abnormal behavior. Moreover, the prediction data may be the one that deems the history of the acquired abnormal behavior as the prediction data of said apparatus as a result of operation of another apparatus of the same type.

At least one of the demand response predictive factor, the operation predictive factor, the demand predictive factor, the power generation amount predictive factor, the electricity price predictive factor, the consumption predictive factor, the preservation amount predictive factor, the power storage amount predictive factor and the abnormality predictive factor may be chronological information at substantially fixed time intervals. At least one of the demand response predictive factor, the operation predictive factor, the demand predictive factor, the power generation amount predictive factor, the electricity price predictive factor, the consumption predictive factor, the preservation amount predictive factor, the power storage amount predictive factor and the abnormality predictive factor may each be added or updated as the time passes. At least one of the demand response predictive factor, the operation predictive factor, the demand predictive factor, the power generation amount predictive factor, the electricity price predictive factor, the consumption predictive factor, the preservation amount predictive factor, the power storage amount predictive factor and the abnormality predictive factor may further include, at least one of the predicted result and the planning data created in the planning apparatus 200. At least one of the demand response predictive factor, the operation predictive factor, the demand predictive factor, the power generation amount predictive factor, the electricity price predictive factor, the consumption predictive factor, the preservation amount predictive factor, the power storage amount predictive factor and the abnormality predictive factor may include the information supplied from an external database or a terminal apparatus, etc. in the hydrogen production system 10 to the control apparatus 140.

The demand response prediction model creation portion 300 is connected to the storage portion 240 and the demand response prediction model updating portion 302, and receives the data for creating a model (for example, a predictive factor and/or a performance, etc.) from the storage portion 240. The demand response prediction model creation portion 300 creates the demand response prediction model based on the demand response predictive factor. The demand response prediction model may be a model for predicting the predicted demand response in the target period based on the demand response predictive factor.

The demand response prediction model creation portion 300 may create the demand response prediction model, using the information in the past of the target period, or by preliminary learning or offline learning, etc. The demand response prediction model creation portion 300 creates a demand response prediction model, using, for example, a regression analysis, a Bayesian reasoning, a neural network, a Gaussian mixture model, and a Hidden Markov model, etc. Moreover, the predicted demand response can also be predicted from the chronology of the factor, if, for example, an LSTM (Long short-term memory), RNN (Recurrent Neural Network) or other model having a storage is used as the demand response prediction model. The demand response prediction model creation portion 300 supplies the created demand response prediction model to the demand response prediction model updating portion 302.

The demand response prediction model updating portion 302 is connected to the storage portion 240 and the demand response prediction portion 304, and receives the data for learning (for example, a predictive factor and/or a performance, etc.) from the storage portion 240. The demand response prediction model updating portion 302 updates the demand response prediction model by learning, using the learning data including the performance of the demand response. Preferably, the demand response prediction model updating portion 302 learns by further using the information which is chronologically later than information of the demand response predictive factor used for creating the demand response prediction model by the demand response prediction model creation portion 300. The demand response prediction model updating portion 302 learns the demand response prediction model, using the information of the demand response predictive factor updated by the actual issuance of the demand response. The demand response prediction model updating portion 302 may update the demand response prediction model by learning, based on, for example, the demand response predictive factor in the past period and the performance of the demand response after the past period.

The demand response prediction model updating portion 302 may update the demand response prediction model to a new one by learning, by each predefined updating period (for example, with an interval of x hours or x days). Instead of this, the demand response prediction model updating portion 302 may update the demand response prediction model, in accordance with various conditions, that are, the predefined number of learnings have been done, or the error difference by learning becomes less than the predefined threshold, etc. The demand response prediction model updating portion 302 may execute learning of the demand response prediction model, in accordance with the fact that the information of the demand response predictive factor has been updated (for example, that the demand response has been issued). The demand response prediction model updating portion 302 may execute one or more times of learning in the updating period. Moreover, the demand response prediction model updating portion 302 may learn a demand response prediction model, by means of adaptive learning or online learning, etc. The demand response prediction model updating portion 302 supplies the updated demand response prediction model to the demand response prediction portion 304.

The demand response prediction portion 304 is connected to the storage portion 240. The demand response prediction portion 304 creates a predicted demand response to be received by the hydrogen production system 10 from the power operator 20 during the target period, using the demand response prediction model.

The demand response prediction portion 304 predicts, for example, a predicted demand response in the future target period, by each predefined period. The demand response prediction portion 304 applies, for example, the information of the demand response predictive factor in the period until just before the target period to the demand response prediction model, to accordingly predict the demand response. The demand response prediction portion 304 supplies the predicted result to the storage portion 240 for storage as the factor to be used by the prediction portion 250 or the planning portion 260. Furthermore, the demand response prediction portion 304 may directly supply the predicted result to another arrangement of the prediction portion 250 or to the planning portion 260.

The operation prediction model creation portion 310 is connected to the storage portion 240 and the operation prediction model updating portion 312, and receives the data for creating a model (for example, a predictive factor and/or a performance, etc.) from the storage portion 240. The operation prediction model creation portion 310 may create an operation prediction model, based on the operation predictive factor. The operation prediction model may be a model that predicts the predicted operation amount of the hydrogen generation apparatus 110 in the target period, based on the operation predictive factor.

The operation prediction model creation portion 310 may create an operation prediction model, using the information in the past of the target period, by preliminary learning or offline learning, etc. The operation prediction model creation portion 310 creates an operation prediction model, using, for example, a regression analysis, a Bayesian reasoning, a neural network, a Gaussian mixture model, and a Hidden Markov model, etc. Moreover, the operation of the hydrogen generation apparatus 110 can also be predicted from the chronology of the factor, if, for example, an LSTM (Long short-term memory), RNN (Recurrent Neural Network) or other model having a storage is used as the operation prediction model. The operation prediction model creation portion 310 supplies the created operation prediction model to the operation prediction model updating portion 312.

The operation prediction model updating portion 312 is connected to the storage portion 240 and the operation prediction portion 314, and receives the data for learning (for example, a predictive factor and/or a performance, etc.) from the storage portion 240. The operation prediction model updating portion 312 updates the operation prediction model by learning, using the learning data including the performance of the operation amount of the hydrogen generation apparatus 110. Preferably, the operation prediction model updating portion 312 learns by further using the information which is chronologically later than information of the operation predictive factor used for creating the operation prediction model by the operation prediction model creation portion 310. The operation prediction model updating portion 312 learns the operation prediction model, using the information of the operation predictive factor updated by the actual operation of the hydrogen generation apparatus 110. The operation prediction model updating portion 312 may update the operation prediction model by learning, based on, for example, the operation predictive factor in the past period and the performance of the operation amount of the hydrogen generation apparatus 110 after the past period.

The operation prediction model updating portion 312 may update the operation prediction model to a new one by learning, by each predefined updating period (for example, with an interval of x hours or x days). Instead of this, the operation prediction model updating portion 312 may update the operation prediction model, in accordance with various conditions, that are, the predefined number of learnings have been done, or the error difference by learning becomes less than the predefined threshold, etc. The operation prediction model updating portion 312 may execute learning of the operation prediction model, in accordance with the fact that the information of the operation predictive factor has been updated. The operation prediction model updating portion 312 may execute one or more times of learning in the updating period. Moreover, the operation prediction model updating portion 312 may learn an operation prediction model, by means of adaptive learning or online learning, etc. The operation prediction model updating portion 312 supplies the updated operation prediction model to the operation prediction portion 314.

The operation prediction portion 314 is connected to the storage portion 240. The operation prediction portion 314 creates a predicted operation amount of the hydrogen generation apparatus 110, using the operation prediction model, based on the operation predictive factor.

The operation prediction portion 314 predicts, for example, the operation amount of the hydrogen generation apparatus 110 in the future target period, by each predefined period. The operation prediction portion 314 applies, for example, the information of the operation predictive factor in the period until just before the target period to the operation prediction model, to accordingly predict the operation amount of the hydrogen generation apparatus 110. The operation prediction portion 314 supplies the predicted result to the storage portion 240 for storage as the factor to be used by the prediction portion 250 or the planning portion 260. Furthermore, the operation prediction portion 314 may directly supply the predicted result to another arrangement of the prediction portion 250 or to the planning portion 260.

The demand prediction model creation portion 320 is connected to the storage portion 240 and the demand prediction model updating portion 322. The demand prediction model creation portion 320 receives the data for creating a model (for example, a predictive factor and/or a performance value, etc.) from the storage portion 240, to accordingly create the demand prediction model. The demand prediction model may be a model that predicts the predicted demand amount of the hydrogen for the hydrogen production system 10 in the target period, based on the demand predictive factor.

The demand prediction model creation portion 320 may create a demand prediction model, using the information in the past of the target period, by preliminary learning or offline learning, etc. The demand prediction model creation portion 320 creates a demand prediction model, using, for example, a regression analysis, a Bayesian reasoning, a neural network, a Gaussian mixture model, and Hidden Markov model, etc. Moreover, the demand amount of the hydrogen can also be predicted from the chronology of the factor, if, for example, an LSTM, an RNN or other model having a storage, as the demand prediction model, is used. The demand prediction model creation portion 320 supplies the created demand prediction model to the demand prediction model updating portion 322.

The demand prediction model updating portion 322 is connected to the storage portion 240 and the demand prediction portion 324. The demand prediction model updating portion 322 updates the demand prediction model by learning, using the learning data including the performance value of the demand amount of the hydrogen. Preferably, the demand prediction model updating portion 322 learns by further using the information which is chronologically later than information of the demand predictive factor used for creating the demand prediction model by the demand prediction model creation portion 320. The demand prediction model updating portion 322 may learn the demand prediction model, using the demand predictive factor updated by the actual hydrogen demand. The demand prediction model updating portion 322 may update the demand prediction model by learning, based on, for example, the demand predictive factor in the past period and the performance value of the demand amount after the past period.

The demand prediction model updating portion 322 may update the demand prediction model to a new one by learning, by each predefined updating period. Instead of this, the demand prediction model updating portion 322 may update the demand prediction model, in accordance with various conditions, that are, the predefined number of learnings have been done, or the error difference by learning becomes less than the predefined threshold, etc. The demand prediction model updating portion 322 may execute learning of the demand prediction model, in accordance with the fact that the information of the demand predictive factor has been updated. The demand prediction model updating portion 322 may execute one or more times of learning in the updating period. Moreover, the demand prediction model updating portion 322 may learn a demand prediction model, by means of adaptive learning or online learning, etc. The demand prediction model updating portion 322 supplies updated demand prediction model to the demand prediction portion 324.

The demand prediction portion 324 is connected to the storage portion 240. The demand prediction portion 324 creates a predicted demand amount of the hydrogen, using the demand prediction model, based on the demand predictive factor.

The demand prediction portion 324 predicts, for example, the demand amount of the hydrogen of the hydrogen production system 10 in the future target period, by each predefined period. The demand prediction portion 324 applies, for example, the demand predictive factor in the period until just before the period to be predicted to the demand prediction model, to accordingly predict the demand amount. The demand prediction portion 324 supplies the predicted result to the storage portion 240 for storage as the factor to be used by the prediction portion 250 or the planning portion 260. Furthermore, the demand prediction portion 324 may directly supply the predicted result to another arrangement of the prediction portion 250 or to the planning portion 260.

The power generation amount prediction model creation portion 330 is connected to the storage portion 240 and the power generation amount prediction model updating portion 332. The power generation amount prediction model creation portion 330 receives the data for creating a model (for example, a predictive factor and/or a performance value, etc.) from the storage portion 240, to accordingly create the power generation amount prediction model. The power generation amount prediction model may be a model that predicts the predicted power generation amount of the power generation apparatus 100 in the target period, based on the power generation amount predictive factor.

The power generation amount prediction model creation portion 330 may create a power generation amount prediction model, using the information in the past of the target period, by preliminary learning or offline learning, etc. The power generation amount prediction model creation portion 330 creates a power generation amount prediction model, using, for example, a regression analysis, a Bayesian reasoning, a neural network, a Gaussian mixture model, and a Hidden Markov model, etc. Moreover, the power generation amount and the like of the power generation apparatus 100 can also be predicted from the chronology of the factor, if, for example, an LSTM, an RNN or other model having a storage, as the power generation amount prediction model, is used. The power generation amount prediction model creation portion 330 supplies the created power generation amount prediction model to the power generation amount prediction model updating portion 332.

The power generation amount prediction model updating portion 332 is connected to the storage portion 240 and the power generation amount prediction portion 334. The power generation amount prediction model updating portion 332 updates the power generation amount prediction model by learning, using the learning data including the performance value of the power generation amount of the power generation apparatus 100. Preferably, the power generation amount prediction model updating portion 332 learns by further using the information which is chronologically later than information of the power generation amount predictive factor used for creating the power generation amount prediction model by the power generation amount prediction model creation portion 330. The power generation amount prediction model updating portion 332 may update the power generation amount prediction model by learning, based on, for example, the power generation amount predictive factor in the past period and the performance value of the power generation amount of the power generation apparatus 100 after the past period. The power generation amount prediction model updating portion 332 learns the power generation amount prediction model, using the information of the power generation amount predictive factor updated by the actual power generation of the power generation apparatus 100.

The power generation amount prediction model updating portion 332 may update the power generation amount prediction model to a new one by learning, by each predefined updating period. Instead of this, the power generation amount prediction model updating portion 332 may update the power generation amount prediction model, in accordance with various conditions, that are, the predefined number of learnings have been done, or the error difference by learning becomes less than the predefined threshold, etc. The power generation amount prediction model updating portion 332 may execute learning of the power generation amount prediction model, in accordance with the fact that the information of the power generation amount predictive factor has been updated. The power generation amount prediction model updating portion 332 may execute one or more times of learning in the updating period. The power generation amount prediction model updating portion 332 may learn a power generation amount prediction model, by means of adaptive learning or online learning, etc. The power generation amount prediction model updating portion 332 supplies updated power generation amount prediction model to the power generation amount prediction portion 334.

The power generation amount prediction portion 334 is connected to the storage portion 240. The power generation amount prediction portion 334 creates a predicted power generation amount of the power generation apparatus 100, using the power generation amount prediction model, based on the power generation amount predictive factor.

The power generation amount prediction portion 334 predicts, for example, a power generation amount of the power generation apparatus 100 in the future target period, by each predefined period. The power generation amount prediction portion 334 receives the power generation amount predictive factor from the storage portion 240. The power generation amount prediction portion 334 applies, for example, the information of the power generation amount predictive factor in the period until just before the period to be predicted to the power generation amount prediction model, to accordingly predict the power generation amount of the power generation apparatus 100. The power generation amount prediction portion 334 supplies the predicted result to the storage portion 240 for storage as the factor to be used by the prediction portion 250 or the planning portion 260. Furthermore, the power generation amount prediction portion 334 may directly supply the predicted result to another arrangement of the prediction portion 250 or to the planning portion 260.

The electricity price prediction model creation portion 340 is connected to the storage portion 240 and the electricity price prediction model updating portion 342. The electricity price prediction model creation portion 340 receives the data for creating a model (for example, a predictive factor and/or a performance value, etc.) from the storage portion 240, to accordingly create the electricity price prediction model. The electricity price prediction model may be a model for calculating the predicted electricity price in the target period, based on the electricity price predictive factor.

The electricity price prediction model creation portion 340 may create an electricity price prediction model, using the information in the past of the target period, by preliminary learning or offline learning, etc. The electricity price prediction model creation portion 340 creates an electricity price prediction model, using, for example, a regression analysis, a Bayesian reasoning, a neural network, a Gaussian mixture model, and a Hidden Markov model, etc. Moreover, the electricity price can also be predicted from the chronology of the factor, if, for example, an LSTM, an RNN or other model having a storage, as the electricity price prediction model, is used. The electricity price prediction model creation portion 340 supplies the created electricity price prediction model to the electricity price prediction model updating portion 342.

The electricity price prediction model updating portion 342 is connected to the storage portion 240 and the electricity price prediction portion 344. The electricity price prediction model updating portion 342 may update the electricity price prediction model by learning, using the learning data including the performance value of the electricity price. Preferably, the electricity price prediction model updating portion 342 learns by further using the information which is chronologically later than information of the electricity price predictive factor for creating the electricity price prediction model used by the electricity price prediction model creation portion 340. The electricity price prediction model updating portion 342 may update the electricity price prediction model by learning, based on, for example, the electricity price predictive factor in the past period and the performance value of the electricity price after the past period. The electricity price prediction model updating portion 342 learns the electricity price prediction model, using the information of the electricity price predictive factor updated by the actual transition of the electricity price.

The electricity price prediction model updating portion 342 may update the electricity price prediction model to a new one, by learning by each predefined updating period. Instead of this, the electricity price prediction model updating portion 342 may update the electricity price prediction model, in accordance with various conditions, that are, the predefined number of learnings have been done, or the error difference by learning becomes less than the predefined threshold, etc. The electricity price prediction model updating portion 342 may execute learning of the electricity price prediction model, in accordance with the fact that the information of the electricity price predictive factor has been updated. The electricity price prediction model updating portion 342 may execute one or more times of learning in the updating period. The electricity price prediction model updating portion 342 may learn a electricity price prediction model, by means of adaptive learning or online learning, etc. The electricity price prediction model updating portion 342 supplies updated electricity price prediction model to the electricity price prediction portion 344.

The electricity price prediction portion 344 is connected to the storage portion 240. The electricity price prediction portion 344 creates the predicted electricity price of the power system, using the electricity price prediction model, based on the electricity price predictive factor.

The electricity price prediction portion 344 predicts the electricity price of the power system in the future target period, by each predefined period. The electricity price prediction portion 344 applies, for example, the information of the electricity price predictive factor in the period until just before the period to be predicted to the electricity price prediction model, to accordingly predict the electricity price. The electricity price prediction portion 344 supplies the predicted result to the storage portion 240 for storage as the factor to be used by the prediction portion 250 or the planning portion 260. Furthermore, the electricity price prediction portion 344 may directly supply the predicted result to another arrangement of the prediction portion 250 or to the planning portion 260.

The consumption prediction model creation portion 350 is connected to the storage portion 240 and the consumption prediction model updating portion 352. The consumption prediction model creation portion 350 receives the data for creating a model (for example, a predictive factor and/or a performance value, etc.) from the storage portion 240, to accordingly create the consumption prediction model. The consumption prediction model may be a model that calculates the predicted consumption amount of the hydrogen in the target period, based on the consumption predictive factor.

The consumption prediction model creation portion 350 may create a consumption prediction model, using the information in the past of the target period, by preliminary learning or offline learning, etc. The consumption prediction model creation portion 350 creates a consumption prediction model, using, for example, a regression analysis, a Bayesian reasoning, a neural network, a Gaussian mixture model, and a Hidden Markov model, etc. Moreover, the consumption amount of the hydrogen can also be predicted from the chronology of the factor, if, for example, an LSTM, an RNN or other model having a storage, as the consumption prediction model, is used. The consumption prediction model creation portion 350 supplies the created consumption prediction model to the consumption prediction model updating portion 352.

The consumption prediction model updating portion 352 is connected to the storage portion 240 and the consumption prediction portion 354. The consumption prediction model updating portion 352 may update the consumption prediction model by learning, using the learning data including the performance value of the consumption amount of the hydrogen. Preferably, the consumption prediction model updating portion 352 learns by further using the information which is chronologically later than information of the consumption predictive factor for creating the consumption prediction model used by the consumption prediction model creation portion 350. The consumption prediction model updating portion 352 may update the consumption prediction model by learning, based on, for example, the consumption predictive factor in the past period and the performance value of the consumption amount of the hydrogen after the past period. The consumption prediction model updating portion 352 may learn a consumption prediction model, using the information of the consumption predictive factor updated by the actual transition of the consumption amount of the hydrogen.

The consumption prediction model updating portion 352 may update the consumption prediction model to a new one by learning, by each predefined updating period. Instead of this, the consumption prediction model updating portion 352 may update the consumption prediction model, in accordance with various conditions, that are, the predefined number of learnings have been done, or the error difference by learning becomes less than the predefined threshold, etc. The consumption prediction model updating portion 352 may execute learning of the consumption prediction model, in accordance with the fact that the information of the consumption predictive factor has been updated. The consumption prediction model updating portion 352 may execute one or more times of learning in the updating period. Moreover, the consumption prediction model updating portion 352 may learn a consumption prediction model, by means of adaptive learning or online learning, etc. The consumption prediction model updating portion 352 supplies the updated consumption prediction model to the consumption prediction portion 354.

The consumption prediction portion 354 is connected to the storage portion 240. The consumption prediction portion 354 creates a predicted consumption amount of the hydrogen, using the consumption prediction model, based on the consumption predictive factor.

The consumption prediction portion 354 predicts, for example, a consumption amount of the hydrogen in the future target period, by each predefined period. The consumption prediction portion 354 applies, for example, the consumption predictive factor in the period until just before the period to be predicted to the consumption prediction model, to accordingly predict the consumption amount of the hydrogen. The consumption prediction portion 354 supplies the predicted result to the storage portion 240 for storage as the factor to be used by the prediction portion 250 or the planning portion 260. Furthermore, the consumption prediction portion 354 may directly supply the predicted result to another arrangement of the prediction portion 250 or to the planning portion 260.

The preservation amount prediction model creation portion 360 is connected to the storage portion 240 and the preservation amount prediction model updating portion 362. The preservation amount prediction model creation portion 360 receives the data for creating a model (for example, a predictive factor and/or a performance value, etc.) from the storage portion 240, to accordingly create the preservation amount prediction model. The preservation amount prediction model may be a model that predicts the predicted preservation amount of the hydrogen of the hydrogen preservation apparatus 120 in the target period, based on the preservation amount predictive factor.

The preservation amount prediction model creation portion 360 may create a preservation amount prediction model, using the preservation amount predictive factor in the past of the target period, by preliminary learning or offline learning, etc. The preservation amount prediction model creation portion 360 creates a preservation amount prediction model, using, for example, a regression analysis, a Bayesian reasoning, a neural network, a Gaussian mixture model, and a Hidden Markov model, etc. Moreover, the preservation amount of the hydrogen preservation apparatus 120 can also be predicted from the chronology of the factor, if, for example, an LSTM, an RNN or other model having a storage, as the preservation amount prediction model, is used. The preservation amount prediction model creation portion 360 supplies the created preservation amount prediction model to the preservation amount prediction model updating portion 362.

The preservation amount prediction model updating portion 362 is connected to the storage portion 240 and the preservation amount prediction portion 364. The preservation amount prediction model updating portion 362 may update the preservation amount prediction model by learning, using the learning data including the performance value of the preservation amount of the hydrogen of the hydrogen preservation apparatus 120. Preferably, the preservation amount prediction model updating portion 362 learns by further using the information which is chronologically later than information of the preservation amount predictive factor used by the preservation amount prediction model creation portion 360 for creating the preservation amount prediction model. The preservation amount prediction model updating portion 362 may update the preservation amount prediction model by learning, based on, for example, the preservation amount predictive factor in the past period and the performance value of the preservation amount of the hydrogen of the hydrogen preservation apparatus 120 after the past period. The preservation amount prediction model updating portion 362 may learn the preservation amount prediction model, using the information of the preservation amount predictive factor updated by the actual transition of the preservation amount of the hydrogen.

The preservation amount prediction model updating portion 362 may update the preservation amount prediction model to a new one by learning, by each predefined updating period. Instead of this, the preservation amount prediction model updating portion 362 may update the preservation amount prediction model, in accordance with various conditions, that are, the predefined number of learnings have been done, or the error difference by learning becomes less than the predefined threshold, etc. The preservation amount prediction model updating portion 362 may execute learning of the preservation amount prediction model, in accordance with the fact that the information of the preservation amount predictive factor has been updated. The preservation amount prediction model updating portion 362 may execute one or more times of learning in the updating period. The preservation amount prediction model updating portion 362 may learn a preservation amount prediction model, by means of adaptive learning or online learning, etc. The preservation amount prediction model updating portion 362 supplies updated preservation amount prediction model to the preservation amount prediction portion 364.

The preservation amount prediction portion 364 is connected to the storage portion 240. The preservation amount prediction portion 364 may create a predicted preservation amount of the hydrogen in the hydrogen preservation apparatus 120, using the preservation amount prediction model and the preservation amount predictive factor.

The preservation amount prediction portion 364 predicts a preservation amount of the hydrogen of the hydrogen preservation apparatus 120 in the future target period, by each predefined period. The preservation amount prediction portion 364 applies, for example, the information of the preservation amount predictive factor in the period until just before the period to be predicted to the preservation amount prediction model, to accordingly predict the preservation amount of the hydrogen of the hydrogen preservation apparatus 120. The preservation amount prediction portion 364 supplies the predicted result to the storage portion 240 for storage as the factor to be used by the prediction portion 250 or the planning portion 260. Furthermore, the preservation amount prediction portion 364 may directly supply the predicted result to another arrangement of the prediction portion 250 or to the planning portion 260.

The power storage amount prediction model creation portion 370 is connected to the storage portion 240 and the power storage amount prediction model updating portion 372. The power storage amount prediction model creation portion 370 receives the data for creating a model (for example, a predictive factor and/or a performance value, etc.) from the storage portion 240, to accordingly create the power storage amount prediction model. The power storage amount prediction model may be a model that predicts the predicted power storage amount of the power storage apparatus 130 in the target period, based on the power storage amount predictive factor.

The power storage amount prediction model creation portion 370 may create a power storage amount prediction model, using the power storage predictive factor in the past of the target period, by preliminary learning or offline learning, etc. The power storage amount prediction model creation portion 370 creates a power storage amount prediction model, using, for example, a regression analysis, a Bayesian reasoning, the neural network, a Gaussian mixture model, and a Hidden Markov model, etc. Moreover, the power storage amount of the power storage apparatus 130 can also be predicted from the chronology of the factor, if, for example, an LSTM, an RNN or other model having a storage, as the power storage amount prediction model, is used. The power storage amount prediction model creation portion 370 supplies the created power storage amount prediction model to the power storage amount prediction model updating portion 372.

The power storage amount prediction model updating portion 372 is connected to the storage portion 240 and the power storage amount prediction portion 374. The power storage amount prediction model updating portion 372 may update the power storage amount prediction model by learning, using the learning data including the performance value of the power storage amount of the power storage apparatus 130. Preferably, the power storage amount prediction model updating portion 372 learns by further using the information which is chronologically later than information of the power storage amount predictive factor used for creating the power storage amount prediction model by the power storage amount prediction model creation portion 370. The power storage amount prediction model updating portion 372 may update the power storage amount prediction model by learning, based on, for example, the power storage amount predictive factor in the past period and the performance value of the power storage amount of the power storage apparatus 130 after the past period. The power storage amount prediction model updating portion 372 learns the power storage amount prediction model, using the information of the power storage amount predictive factor updated by the actual transition of the power storage amount.

The power storage amount prediction model updating portion 372 may update the power storage amount prediction model to a new one by learning, by each predefined updating period. Instead of this, the power storage amount prediction model updating portion 372 may update the power storage amount prediction model, in accordance with various conditions, that are, the predefined number of learnings have been done, or the error difference by learning becomes less than the predefined threshold, etc. The power storage amount prediction model updating portion 372 may execute learning of the power storage amount prediction model, in accordance with the fact that the information of the power storage amount predictive factor has been updated. The power storage amount prediction model updating portion 372 may execute one or more times of learning in the updating period. The power storage amount prediction model updating portion 372 may learn a power storage amount prediction model, by means of adaptive learning or online learning, etc. The power storage amount prediction model updating portion 372 supplies the updated power storage amount prediction model to the power storage amount prediction portion 374.

The power storage amount prediction portion 374 is connected to the storage portion 240. The power storage amount prediction portion 374 creates the predicted power storage amount of the power storage apparatus 130, using the updated power storage amount prediction model, based on the power storage amount predictive factor.

The power storage amount prediction portion 374 predicts a power storage amount of the power storage apparatus 130 in the future target period, by each predefined period. The power storage amount prediction portion 374 applies, for example, the information of the power storage amount predictive factor in the period until just before the period to be predicted to the power storage amount prediction model, to accordingly predict the power storage amount of the power storage apparatus 130. The power storage amount prediction portion 374 supplies the predicted result to the storage portion 240 for storage as the factor to be used by the prediction portion 250 or the planning portion 260. Furthermore, the power storage amount prediction portion 374 may directly supply the predicted result to another arrangement of the prediction portion 250 or to the planning portion 260. L0117] The abnormality prediction model creation portion 380 is connected to the storage portion 240 and the power storage amount prediction model updating portion 372. The power storage amount prediction model creation portion 370 receives the data for creating a model (for example, a predictive factor and/or a performance, etc.) from the storage portion 240, to accordingly create the abnormality prediction model. The abnormality prediction model may be a model that predicts an abnormality occurrence of the hydrogen production system 10, based on the abnormality predictive factor including the operation state of the hydrogen production system 10.

The abnormality prediction model creation portion 380 may create an abnormality prediction model, using the abnormality predictive factor in the past of the target period, by preliminary learning or offline learning, etc. The abnormality prediction model creation portion 380 creates an abnormality prediction model, using, for example, a regression analysis, the Bayesian reasoning, a neural network, a Gaussian mixture model, and a Hidden Markov model, etc. Moreover, the abnormality occurrence of the hydrogen production system 10 can also be predicted from the chronology of the factor, if, for example, an LSTM, an RNN or other model having a storage, as the abnormality prediction model, is used. The abnormality prediction model creation portion 380 supplies the created abnormality prediction model to the abnormality prediction model updating portion 382.

The abnormality prediction model updating portion 382 is connected to the storage portion 240 and the abnormality prediction portion 384. The abnormality prediction model updating portion 382 may update the abnormality prediction model by learning, using the learning data including the performance of the abnormal behavior (for example, the timing of occurrence of the abnormality, the content of the abnormality, the apparatus to which the abnormality has occurred, the component, or the effect by the abnormality to the hydrogen production, etc., in the hydrogen production system 10). Preferably, the abnormality prediction model updating portion 382 learns by further using the information which is chronologically later than information of the abnormality predictive factor used for creating the abnormality prediction model by the abnormality prediction model creation portion 380. The abnormality prediction model updating portion 382 may update the abnormality prediction model by learning, based on, for example, the abnormality predictive factor in the past period and the performance of the abnormal behavior after the past period. The abnormality prediction model updating portion 382 learns the abnormality prediction model, using the information of the abnormality predictive factor updated by the actual abnormal behavior.

The abnormality prediction model updating portion 382 may update the abnormality prediction model to a new one by learning, by each predefined updating period. Instead of this, the abnormality prediction model updating portion 382 may update the abnormality prediction model, in accordance with various conditions, that are, the predefined number of learnings have been done, or the error difference by learning becomes less than the predefined threshold, etc. The abnormality prediction model updating portion 382 may execute learning of the abnormality prediction model, in accordance with the fact that the information of the abnormality predictive factor has been updated. The abnormality prediction model updating portion 382 may execute one or more times of learning in the updating period. The abnormality prediction model updating portion 382 may learn an abnormality prediction model, by means of adaptive learning or online learning, etc. The abnormality prediction model updating portion 382 supplies updated abnormality prediction model to the abnormality prediction portion 384.

The abnormality prediction portion 384 is connected to the storage portion 240. The abnormality prediction portion 384 predicts the abnormality of the hydrogen production system 10, using the updated abnormality prediction model, based on the abnormality predictive factor.

The abnormality prediction portion 384 predicts an abnormality in the future target period, by each predefined period. The abnormality prediction portion 384 applies, for example, the abnormality predictive factor in the period until just before the period to be predicted to the abnormality prediction model, to accordingly predict the abnormality. The abnormality prediction portion 384 supplies the predicted result to the storage portion 240 for storage as the factor to be used by the prediction portion 250 or the planning portion 260. Furthermore, the abnormality prediction portion 384 may directly supply the predicted result to another arrangement of the prediction portion 250 or to the planning portion 260.

Figure 4:
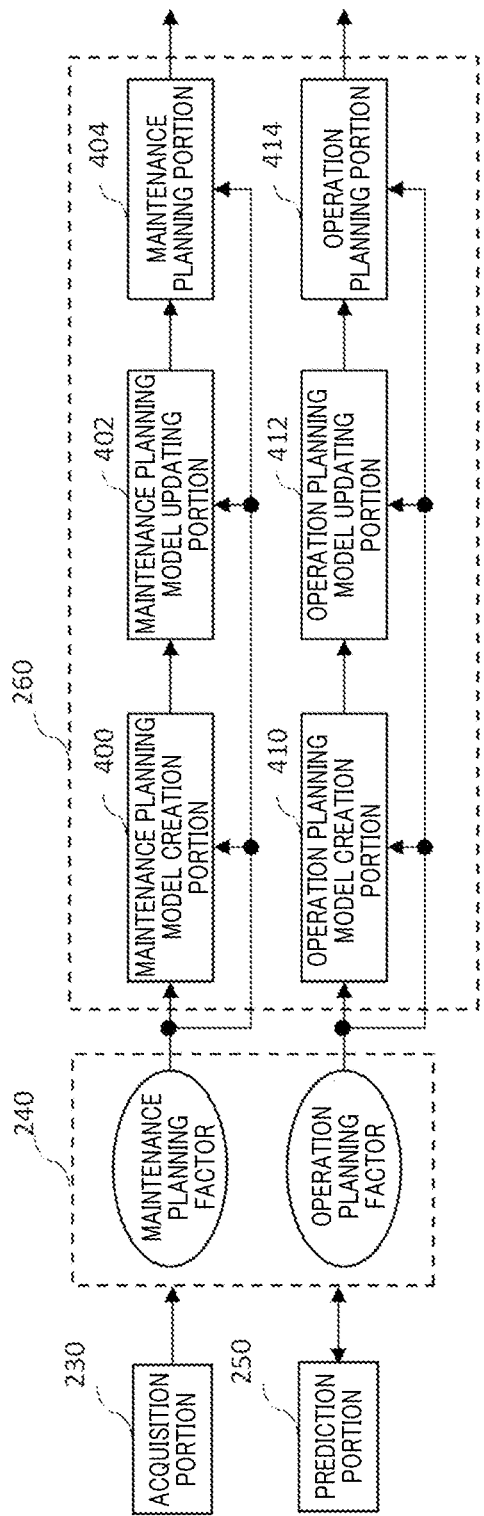
FIG. 4 shows the detailed arrangement of the planning portion 260 of the planning apparatus 200 of this embodiment.

FIG. 4 shows the detailed arrangement of the planning portion 260 of the planning apparatus 200 of this embodiment. The planning portion 260 has a maintenance planning model creation portion 400, a maintenance planning model updating portion 402 and a maintenance planning portion 404, and creates a maintenance plan for one or more apparatuses in the hydrogen production system 10. The planning portion 260 has an operation planning model creation portion 410, an operation planning model updating portion 412 and an operation planning portion 414, and creates an operation plan for the hydrogen generation apparatus 110.

Here, the storage portion 240 stores a planning factor which includes at least one of the maintenance planning factor and the operation planning factor.

The maintenance planning factor may include the information related to the maintenance of the apparatus in the hydrogen production system 10. The maintenance planning factor may include an abnormality predicted by the abnormality prediction portion 384. Moreover, the maintenance planning factor may include a maintenance plan for the hydrogen production system 10 before the target period. The maintenance planning factor may include the information, such as, the worker who can execute the maintenance work of each apparatus, the apparatus with which the maintenance work can be executed, and the replacement component of each apparatus of the hydrogen production system 10. Furthermore, the maintenance planning factor may include the information, such as, the timing, the period and the content of the executed maintenance work, and the change of the operation rate of the apparatus due to the maintenance work before the target period. The maintenance planning factor may include the abnormality predictive factor.

The operation planning factor may include the information related to the operation of the hydrogen generation apparatus 110. The operation planning factor may include, for example, at least one of a demand response for the hydrogen production system 10 before the target period, a predicted demand response in the target period, an operation amount of the hydrogen generation apparatus 110 before the target period, a creation efficiency of the hydrogen of the hydrogen generation apparatus 110 (for example, a creation amount of the hydrogen per unit power or per unit time and the like), a predicted demand amount of the hydrogen in the target period, a maintenance plan before the target period, a type of a renewable energy used for power generation by the power generation apparatus 100, a power generation amount of the power generation apparatus 100 before the target period, a predicted power generation amount in the target period, a power storage amount of the power storage apparatus 130 before the target period, a predicted power storage amount in the target period, an electricity price of the power system before the target period, a predicted electricity price in the target period, a preservation amount of the hydrogen of the hydrogen preservation apparatus 120 before the target period, a predicted preservation amount in the target period, a predicted operation amount of the hydrogen generation apparatus 110 in the target period, and a maintenance plan for the hydrogen production system 10 in the target period.

At least one of the maintenance planning factor and the operation planning factor may be the chronological information at substantially fixed time intervals. At least one of the maintenance planning factor and the operation planning factor may be added or updated respectively as the time passes. At least one of the maintenance planning factor and the operation planning factor may include at least one of the predicted result and the planning data created in the planning apparatus 200. Moreover, at least one of the maintenance planning factor and the operation planning factor may include the information supplied from the external database and the terminal apparatus and the like in the hydrogen production system 10.

The maintenance planning model creation portion 400 is connected to the storage portion 240 and the maintenance planning model updating portion 402, and receives the data for creating a model (for example, a planning factor or a performance, etc.) from the storage portion 240, to accordingly create the maintenance planning model. The maintenance planning model may be a model that creates a maintenance plan for at least one apparatus of the hydrogen production system 10 in the target period, based on the maintenance planning factor before the target period.

The maintenance planning model creation portion 400 may create a maintenance planning model, using the information in the past of the target period, by preliminary learning or offline learning, etc. The maintenance planning model creation portion 400 creates a maintenance planning model, using, for example, a regression analysis, a Bayesian reasoning, a neural network, a Gaussian mixture model, and a Hidden Markov model, etc. Moreover, the maintenance plan can also be created from the chronology of the factor, if, for example, an LSTM, an RNN or other model having a storage, as the maintenance planning model, is used. The maintenance planning model creation portion 400 supplies the created maintenance planning model to the maintenance planning model updating portion 402.

The maintenance planning model updating portion 402 is connected to the storage portion 240 and the maintenance planning portion 404. The maintenance planning model updating portion 402 learns the maintenance planning model, for example, by means of executing a reinforcement learning, such as a Q-learning, a SARSA method, or a Monte Carlo method.

The maintenance planning model updating portion 402 may update the maintenance planning model by learning, based on an evaluation index for evaluating the productivity of the hydrogen in the hydrogen production system 10. The maintenance planning model updating portion 402 may learn to update the maintenance planning model in order that the evaluation index under the restrictive condition including that the predicted demand amount of the hydrogen should be satisfied, etc., should be within the predetermined range (as an example, the maximum value). Here, the restrictive condition may include at least one of the maximum preservable amount of the hydrogen preservation apparatus 120, the maximum power accumulable amount of the power storage apparatus 130, and the discharge rate of power accumulated in the power storage apparatus 130.

Moreover, the evaluation index may be the one that is based on at least one of the maintenance work cost, the lowering of the hydrogen creation efficiency due to the maintenance work, the management cost, the sales, and the profit, in the hydrogen production system 10, as well as the initial cost per unit amount of the hydrogen to be supplied. The evaluation index may be calculated by the planning apparatus 200, or may be supplied from an external apparatus to the planning apparatus 200. The evaluation index may be, for example, the one that is calculated with an objective function. The evaluation index may be, as an example, calculated with an objective function of a weighted sum, the sum being derived by weighing onto each of some among the maintenance work cost of the hydrogen production system 10, the lowering of the hydrogen creation efficiency due to the maintenance work, the management cost of the hydrogen production system 10, the sales, and the profit, as well as the initial costs per unit amount of the hydrogen supplied by the hydrogen production system 10.

Preferably, the maintenance planning model updating portion 402 learns by further using the information which is chronologically later than information of the maintenance planning factor used by the maintenance planning model creation portion 400 for creating the maintenance planning model. The maintenance planning model updating portion 402 may update the maintenance planning model by learning, based on, for example, the maintenance planning factor in the past period and the maintenance planning factor after the past period and/or the evaluation index. The maintenance planning model updating portion 402 learns the maintenance planning model, using the evaluation index calculated in accordance with the actual practice of the maintenance plan.

The maintenance planning model updating portion 402 may, for example, update the maintenance planning model to a new one by learning, by each predefined updating period. Instead of this, the maintenance planning model updating portion 402 may update the maintenance planning model, in accordance with various conditions, that are, the predefined number of learnings have been done, or the evaluation index becomes the maximum, the minimum, or within the predefined range, etc. The maintenance planning model updating portion 402 may learn the maintenance planning model, by means of adaptive learning or online learning, etc. The maintenance planning model updating portion 402 may execute one or more times of learning in the updating period. The maintenance planning model updating portion 402 supplies the updated maintenance planning model to the maintenance planning portion 404.

The maintenance planning portion 404 is connected to the storage portion 240. The operation planning portion 414 creates the maintenance plan for the hydrogen production system 10 based on the maintenance planning factor, using the maintenance planning model.

The maintenance planning portion 404 creates, for example, a maintenance plan in the future target period, by each predefined period. The maintenance planning portion 404 applies, for example, the information of the maintenance planning factor in the period until just before the period to be planned to the maintenance planning model, to accordingly create the maintenance plan. The maintenance planning portion 404 may directly supply the planning data of the maintenance plan to at least one of the calculation portion 210, the control portion 220 and the storage portion 240. Moreover, the maintenance planning portion 404 may directly supply the planning data to the prediction portion 250 and/or the operation planning portion 414.

The operation planning model creation portion 410 is connected to the storage portion 240 and the operation planning model updating portion 412, and receives the data for creating a model (for example, a planning factor and/or a performance, etc.) from the storage portion 240, to accordingly create the operation planning model. The operation planning model may be a model that creates an operation plan for the hydrogen generation apparatus 110 during the target period, based on the operation planning factor before the target period.

The operation planning model creation portion 410 may create an operation planning model, using the information in the past of the target period, by preliminary learning or offline learning, etc. The operation planning model creation portion 410 creates an operation planning model, using, for example, a regression analysis, a Bayesian reasoning, a neural network, a Gaussian mixture model, and a Hidden Markov model, etc. Moreover, the operation plan can also be created from the chronology of the factor, if, for example, an LSTM, an RNN or other model having a storage, as the operation planning model, is used. The operation planning model creation portion 410 supplies the created operation planning model to the operation planning model updating portion 412.

The operation planning model updating portion 412 is connected to the storage portion 240 and the operation planning portion 414. The operation planning model updating portion 412 learns the operation planning model, for example, by means of executing a reinforcement learning, such as a Q-learning, a SARSA method or a Monte Carlo method.

The operation planning model updating portion 412 updates the operation planning model by learning, based on the evaluation index for evaluating the productivity of the hydrogen (as an example, the profit to be obtained by the hydrogen production system 10) in the hydrogen production system 10. The operation planning model updating portion 412 may learn to update the operation planning model in order that the evaluation index under the restrictive condition including that the predicted demand amount of the hydrogen should be satisfied, etc., should be within the predetermined range (as an example, the maximum value). Here, the restrictive condition may further include at least one of the maximum preservable amount of the hydrogen preservation apparatus 120, the maximum power accumulable amount of the power storage apparatus 130, and the discharge rate of power accumulated in the power storage apparatus 130.

Moreover, the evaluation index may be the one that is based on at least one of the management cost, the sales, and the profit, in the hydrogen production system 10, as well as the initial cost per unit amount of the hydrogen to be supplied. The evaluation index may be calculated by the planning apparatus 200, or may be supplied from an external apparatus to the planning apparatus 200. The evaluation index may be, for example, the one that is calculated with an objective function. The evaluation index may be, as an example, calculated with an objective function of a weighted sum, the sum being derived by weighing onto each of some among the management cost of the hydrogen production system 10, the sales, and the profit, as well as the initial costs per unit amount of the hydrogen supplied by the hydrogen production system 10.

Preferably, the operation planning model updating portion 412 learns by further using the information which is chronologically later than information of the operation planning factor used for creating the operation planning model by the operation planning model creation portion 410. The operation planning model updating portion 412 may update the operation planning model by learning, based on, for example, the operation planning factor in the past period and the operation planning factor after the past period and/or the evaluation index for the operation plan. The operation planning model updating portion 412 learns the operation planning model, using the evaluation index calculated in accordance with the actual practice of the operation plan.

The operation planning model updating portion 412 may, for example, update the operation planning model to a new one by learning, by each predefined updating period. Instead of this, the operation planning model updating portion 412 may update the operation planning model, in accordance with various conditions, that are, the predefined number of learnings have been done, or the evaluation index becomes the maximum, the minimum, or within the predefined range, etc. The operation planning model updating portion 412 may learn the operation planning model, by means of adaptive learning or online learning, etc. The operation planning model updating portion 412 may execute one or more times of learning in the updating period. The operation planning model updating portion 412 supplies the updated operation planning model to the operation planning portion 414.

The operation planning portion 414 is connected to the storage portion 240. The operation planning portion 414 creates the operation plan for the hydrogen generation apparatus 110, using the operation planning model, based on the operation planning factor, including, the demand response, before the target period of the operation plan, and at least one of the electricity price, the demand amount of hydrogen and the amount of stored hydrogen, before the target period.

The operation planning portion 414 creates, for example, an operation plan in the future target period, by each predefined period. The operation planning portion 414 applies, for example, the information of the operation planning factor in the period until just before the period to be planned to the operation planning model, to accordingly create the operation plan. The operation planning portion 414 may supply the planning data of the operation plan to at least one of the calculation portion 210, the control portion 220 and the storage portion 240. Moreover, the operation planning portion 414 may directly supply the planning data to the prediction portion 250.

With the control apparatus 140 according to this embodiment as described above, an efficient plan for supplying the hydrogen at low cost in the hydrogen production system 10 can be created, with the model created by learning that takes the demand response into account. Next, behaviors of such control apparatus 140 will be explained.

Figure 5:
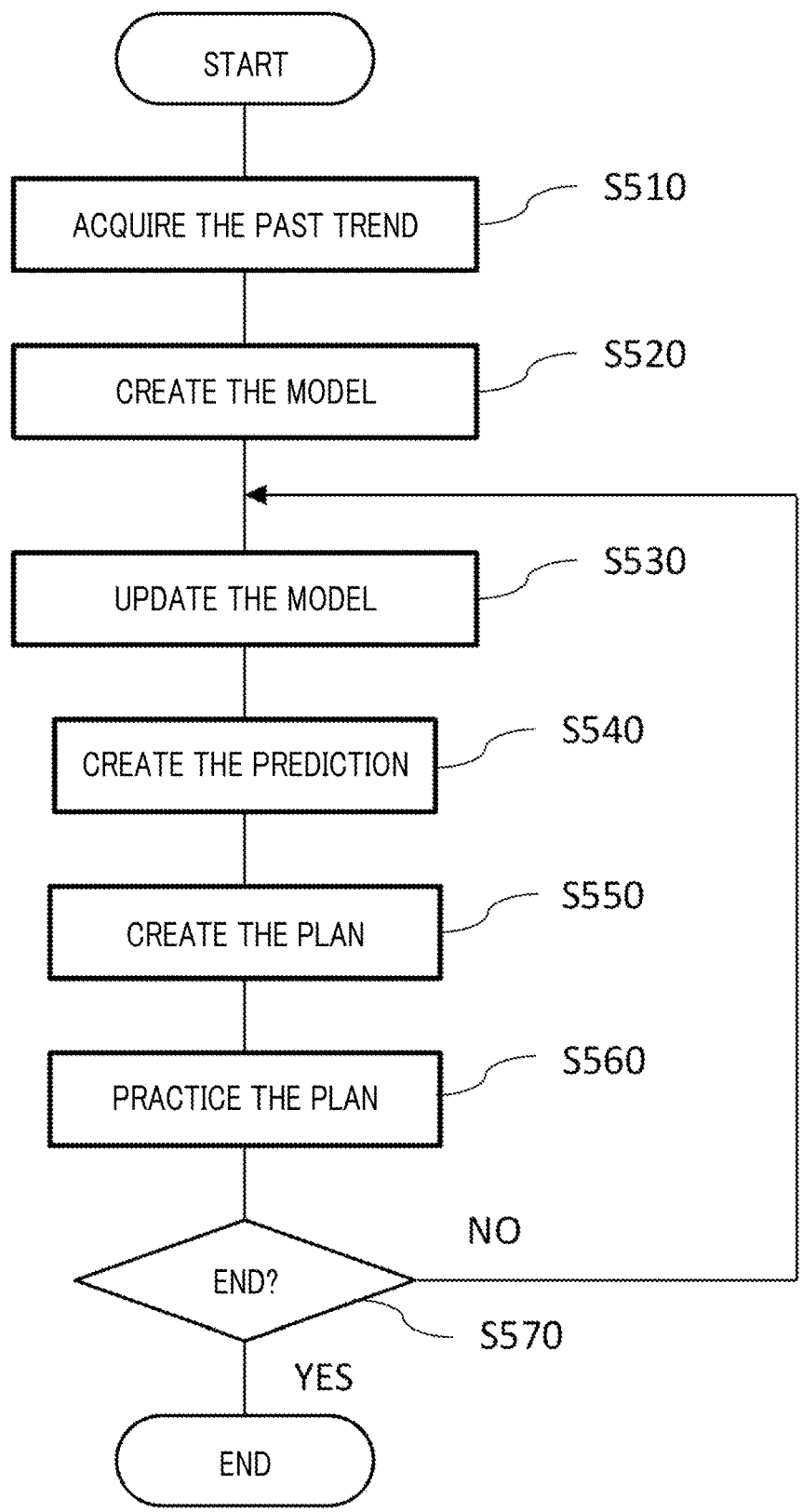
FIG. 5 shows an example of the behavior flow of the control apparatus 140 according to this embodiment.

FIG. 5 shows an example of the behavior flow of the control apparatus 140 according to this embodiment.

The control portion 220 and the acquisition portion 230 acquire the information of the predictive factor to become the past trend and the planning factor (S510). The control portion 220 and the acquisition portion 230 acquire, for example, the information of the predictive factor and the planning factor during from the time point t0 to the time point t1. The storage portion 240 receives to store the information of the acquired predictive factor and planning factor. Moreover, the acquisition portion 230 may directly supply the information of the predictive factor and planning factor to the prediction portion 250 and the planning portion 260.

Next, the prediction portion 250 and the planning portion 260 create the learning model (S520). The prediction portion

250 and the planning portion 260 create the learning model, based on the predictive factor and the planning factor during the period from the time point t0 to the time point t1, which were received from the storage portion 240.

The demand response prediction model creation portion 300 creates the demand response prediction model, using the demand response predictive factor during the period from the time point t0 to the time point t1. The operation prediction model creation portion 310 creates the operation prediction model, using the operation predictive factor during the period from the time point t0 to the time point t1. The demand prediction model creation portion 320 creates the demand prediction model, using the demand predictive factor during the period from the time point t0 to the time point t1. The power generation amount prediction model creation portion 330 creates the power generation amount prediction model, using the power generation amount predictive factor during the period from the time point t0 to the time point t1.

The electricity price prediction model creation portion 340 creates the electricity price prediction model, using the electricity price predictive factor during the period from the time point t0 to the time point t1. The consumption prediction model creation portion 350 creates the consumption prediction model, using the consumption predictive factor during the period from the time point t0 to the time point t1. The preservation amount prediction model creation portion 360 creates the preservation amount prediction model, using the preservation amount predictive factor during the period from the time point t0 to the time point t1. The power storage amount prediction model creation portion 370 creates a power storage amount prediction model, using the power storage amount predictive factor during the period from the time point t0 to the time point t1. The abnormality prediction model creation portion 380 creates an abnormality prediction model, using the abnormality predictive factor during the period from the time point t0 to the time point t1.

The maintenance planning model creation portion 400 creates the maintenance planning model, using the maintenance planning factor during the period from the time point t0 to the time point t1. The operation planning model creation portion 410 creates the operation planning model, using the operation planning factor during the period from the time point t0 to the time point t1.

Moreover, the prediction portion 250 and the planning portion 260 may create the model, by means of taking the virtual data based on the physical model of the target apparatus in the hydrogen production system 10 as the prediction data, and accordingly comparing it with the actual data acquired in said prediction data as well as the operation of the target apparatus in the past. For example, the prediction portion 250 and the planning portion 260 execute learning to create the model, in order that the error between the predicted result or the planning data and the objective data drawn out from the actual data in the past should be the error minimum (for example, 0) or less than the predefined value.

The prediction portion 250 and the planning portion 260 take, as an example, the period of M days during the period from the time point t0 to the time point t1, as the virtual target period. Note that, the M days may be a period of, for example, several days or a dozen of days, one or several weeks, etc. Then, the prediction portion 250 and the planning portion 260 learn in order that error between the predicted result or the planning data in the target period based on the factor in the period before the target period during the period from the time point t0 to the time point t1 and the actual data or the virtual data in the target period should be the minimum.

Note that, such creation of a learning model by the prediction portion 250 and the planning portion 260 may be executed before the control apparatus 140 acquires the actual data of the target apparatus along with the operation of said target apparatus.

Next, the prediction portion 250 and the planning portion 260 learn to update the created learning model (S530). Here, the control portion 220 and the acquisition portion 230 may further acquire the information of each factor. The control portion 220 and the acquisition portion 230 acquire, for example, the information of each factor during from the time point t2 to the time point t3. Furthermore, the control apparatus 140 may calculate or acquire from an external apparatus and the like the evaluation index of the plan practiced during from the time point 2 to the time point t3. Moreover, the prediction portion 250 and the planning portion 260 may create, for example, the information of each factor including the predicted result and the planning data, etc., during from the time point t2 to the time point t3. Note that, the period from the time point t2 to the time point t3 is set to the period after the period from the time point t0 to the time point t1. The prediction portion 250 and the planning portion 260 may learn, using new information of each factor and/or the evaluation index.

For example, the demand response prediction model updating portion 302 performs adaptive learning of the demand response prediction model, based on the demand response predictive factor. The demand response prediction model updating portion 302 may perform adaptive learning of the demand response prediction model, using the issue content of the demand response during the period from the time point t2 to the time point t3. The demand response prediction model updating portion 302 may learn in order that the predicted result of the demand response using the demand response prediction model during the period from the time point t2 to the time point t3 should match with the performance of the acquired actual demand response in the period from the time point t2 to the time point t3.

The demand response prediction model updating portion 302 takes, as an example, the period of M days during the period from the time point t2 to the time point t3, as the virtual target period. Note that, the M days may be a period of, for example, several days or a dozen of days, one or several weeks, one or several months, one or several years, etc. The demand response prediction model updating portion 302 may learn, in order that the error between the predicted result based on the demand response predictive factor in the period before the target period from the time point t2 to the time point t3 and the performance in said target period should be the error minimum (for example, 0) or less than the predefined value.

The operation prediction model updating portion 312 performs adaptive learning of the operation prediction model, based on the operation predictive factor. The operation prediction model updating portion 312 may perform adaptive learning of the operation prediction model, using the operation state of the hydrogen generation apparatus 110 during the period from the time point t2 to the time point t3. The operation prediction model updating portion 312 may learn, in order that the predicted result of the operation amount and the like of the hydrogen generation apparatus 110, using the operation prediction model, during the period from the time point t2 to the time point t3, should match with the acquired actual operation state (performance value) of said hydrogen generation apparatus 110 during the period from the time point t2 to the time point t3.

The operation prediction model updating portion 312 takes, as an example, the period of M days during the period from the time point t2 to the time point t3, as the virtual target period. Note that, the M days may be a period of, for example, several days or a dozen of days, one or several weeks, one or several months, one or several years, etc. The operation prediction model updating portion 312 may learn, in order that the error between the predicted result of the target period based on the operation predictive factor in the period before the target period during from the time point t2 to the time point t3 and the performance value in said target period should be the error minimum (for example, 0) or less than the predefined value.

The demand prediction model updating portion 322 performs adaptive learning of the demand prediction model, based on the demand predictive factor. The demand prediction model updating portion 322 may perform adaptive learning of the demand prediction model, using the demand amount of the hydrogen for the hydrogen production system 10 during the period from the time point t2 to the time point t3. The demand prediction model updating portion 322 may learn, in order that the predicted result of the demand amount of the hydrogen, using the demand prediction model, during the period from the time point t2 to the time point t3, should match with the acquired actual demand amount (performance value) of the hydrogen during the period from the time point t2 to the time point t3.

The demand prediction model updating portion 322 takes, as an example, the period of M days during the period from the time point t2 to the time point t3, as the virtual target period. Note that, the M days may be a period of, for example, several days or a dozen of days, one or several weeks, one or several months, one or several years, etc. The demand prediction model updating portion 322 may learn, in order that the error between the predicted result of the target period based on the demand predictive factor in the period before the target period during from the time point t2 to the time point t3 and the performance value in said target period should be the error minimum (for example, 0) or less than the predefined value.

The power generation amount prediction model updating portion 332 performs adaptive learning of the power generation amount prediction model, based on the power generation amount predictive factor. The power generation amount prediction model updating portion 332 may perform adaptive learning of the power generation amount prediction model, using the power generation amount of the power generation apparatus 100 during the period from the time point t2 to the time point t3. The power generation amount prediction model updating portion 332 may learn, in order that the predicted result of the power generation amount of the power generation apparatus 100, using the power generation amount prediction model, during the period from the time point t2 to the time point t3, should match with the acquired actual power generation amount (performance value) during the period from the time point t2 to the time point t3.

The power generation amount prediction model updating portion 332 takes, as an example, the period of M days during the period from the time point t2 to the time point t3, as the virtual target period. Note that, the M days may be a period of, for example, several days or a dozen of days, one or several weeks, one or several months, one or several years, etc. The power generation amount prediction model updating portion 332 may learn, in order that the error between the predicted result of the target period based on the power generation amount predictive factor in the period before the target period during from the time point t2 to the time point t3 and the performance value in said target period should be the error minimum (for example, 0) or less than the predefined value.

The electricity price prediction model updating portion 342 performs adaptive learning of the electricity price prediction model, based on the electricity price predictive factor. The electricity price prediction model updating portion 342 may perform adaptive learning of the electricity price prediction model, using the electricity price of the power system during the period from the time point t2 to the time point t3. The electricity price prediction model updating portion 342 may learn, in order that the predicted result of the electricity price, using the electricity price prediction model, during the period from the time point t2 to the time point t3, should match with the acquired actual electricity price (performance value) during the period from the time point t2 to the time point t3.

The electricity price prediction model updating portion 342 takes, as an example, the period of M days during the period from the time point t2 to the time point t3, as the virtual target period. Note that, the M days may be a period of, for example, several days or a dozen of days, one or several weeks, one or several months, one or several years, etc. The electricity price prediction model updating portion 342 learns, in order that the error between the predicted result of the target period based on the electricity price predictive factor in the period before the target period during from the time point t2 to the time point t3 and the performance value in said target period should be the error minimum (for example, 0) or less than the predefined value.

The consumption prediction model updating portion 352 performs adaptive learning of the consumption prediction model, based on the consumption predictive factor. The consumption prediction model updating portion 352 may perform adaptive learning of the consumption prediction model, using the consumption amount of the hydrogen during the period from the time point t2 to the time point t3. The consumption prediction model updating portion 352 may learn, in order that the predicted result of the consumption amount of the hydrogen, using the consumption prediction model, during the period from the time point t2 to the time point t3, should match with the acquired actual consumption amount (performance value) during the period from the time point t2 to the time point t3.

The consumption prediction model updating portion 352 takes, as an example, the period of M days during the period from the time point t2 to the time point t3, as the virtual target period. Note that, the M days may be a period of, for example, several days or a dozen of days, one or several weeks, one or several months, one or several years, etc. The consumption prediction model updating portion 352 may learn, in order that the error between the predicted result of the target period based on the consumption predictive factor in the period before the target period during from the time point t2 to the time point t3 and the performance value in said target period should be the error minimum (for example, 0) or less than the predefined value.

The preservation amount prediction model updating portion 362 perform adaptive learning of the preservation amount prediction model, based on the preservation amount predictive factor. The preservation amount prediction model updating portion 362 may perform adaptive learning of the preservation amount prediction model, using the preservation amount of the hydrogen in the hydrogen preservation apparatus 120 during the period from the time point t2 to the time point t3. The preservation amount prediction model updating portion 362 may learn, in order that the predicted result of the preservation amount of the hydrogen of the hydrogen preservation apparatus 120, using the preservation amount prediction model, during the period from the time point t2 to the time point t3, should match with the acquired actual preservation amount (performance value) of the hydrogen preservation apparatus 120 during the period from the time point t2 to the time point t3.

The preservation amount prediction model updating portion 362 takes, as an example, the period of M days during the period from the time point t2 to the time point t3, as the virtual target period. Note that, the M days may be a period of, for example, several days or a dozen of days, one or several weeks, one or several months, one or several years, etc. The preservation amount prediction model updating portion 362 may learn, in order that the error between the predicted result of the target period based on the preservation amount predictive factor in the period before the target period during from the time point t2 to the time point t3 and the performance value in said target period should be the error minimum (for example, 0) or less than the predefined value.

The power storage amount prediction model updating portion 372 performs adaptive learning of the power storage amount prediction model, based on the power storage amount predictive factor. The power storage amount prediction model updating portion 372 may perform adaptive learning of the power storage amount prediction model, using the power storage amount of the power storage apparatus 130 during the period from the time point t2 to the time point t3. The power storage amount prediction model updating portion 372 may learn, in order that the predicted result of the power storage amount of the power storage apparatus 130, using the power storage amount prediction model, during the period from the time point t2 to the time point t3, should match with the acquired actual power storage amount (performance value) of the power storage apparatus 130 during the period from the time point t2 to the time point t3.

The power storage amount prediction model updating portion 372 takes, as an example, the period of M days during the period from the time point t2 to the time point t3, as the virtual target period. Note that, the M days may be a period of, for example, several days or a dozen of days, one or several weeks, one or several months, one or several years, etc. The power storage amount prediction model updating portion 372 may learn, in order that the error between the predicted result of the target period based on the power storage amount predictive factor in the period before the target period during from the time point t2 to the time point t3 and the performance value in said target period should be the error minimum (for example, 0) or less than the predefined value.

The abnormality prediction model updating portion 382 performs adaptive learning of the abnormality prediction model, based on the abnormality predictive factor. The abnormality prediction model updating portion 382 may perform adaptive learning of the abnormality prediction model, using the operation state of the hydrogen production system 10 during the period from the time point t2 to the time point t3. The abnormality prediction model updating portion 382 may learn, in order that the predicted result of the abnormality of the hydrogen production system 10, using the abnormality prediction model, during the period from the time point t2 to the time point t3, should match with the acquired actual abnormality occurrence (performance) of the hydrogen production system 10 during the period from the time point t2 to the time point t3.

The abnormality prediction model updating portion 382 takes, as an example, the period of M days during the period from the time point t2 to the time point t3, as the virtual target period. Note that, the M days may be a period of, for example, several days or a dozen of days, one or several weeks, one or several months, one or several years, etc. The abnormality prediction model updating portion 382 may learn, in order that the error between the predicted result of the target period based on the abnormality predictive factor in the period before the target period during from the time point t2 to the time point t3 and the performance in said target period should be the error minimum (for example, 0) or less than the predefined value.

Moreover, the maintenance planning model updating portion 402 may perform adaptive learning of a maintenance planning model, based on the evaluation index for evaluating the productivity of the hydrogen production system 10. For example, the maintenance planning model updating portion 402 may learn the maintenance planning model, using the learning data including the evaluation index during the period from the time point t2 to the time point t3. The maintenance planning model updating portion 402 may execute reinforcement learning, as for the maintenance plan created by using the maintenance planning model during the period from the time point t2 to the time point t3, in order that the value of the evaluation index should be the minimum (for example, 0), the maximum or within the predefined range under the restrictive condition which includes satisfying the predicted demand amount of hydrogen.

The maintenance planning model updating portion 402 takes, as an example, the period of M days during the period from the time point t2 to the time point t3, as the virtual target period. Note that, the M days may be a period of, for example, several days or a dozen of days, one or several weeks, one or several months, one or several years, etc. The maintenance planning model updating portion 402 may perform reinforcement learning, as for the maintenance plan in the target period based on the maintenance planning factor in the period before the target period from the time point t2 to the time point t3, in order that the objective function should be maximized, using actual hydrogen demand and the practiced performance data of the maintenance plan in said target period.

The operation planning model updating portion 412 may perform adaptive learning of an operation planning model, based on the evaluation index associated with the profit to be obtained by the hydrogen production system 10. For example, the operation planning model updating portion 412 may learn an operation planning model, using the learning data including the evaluation index during the period from the time point t2 to the time point t3. The operation planning model updating portion 412 may execute reinforcement learning, as for the operation plan created by using the operation planning model during the period from the time point t2 to the time point t3, in order that the value of the evaluation index should be the minimum (for example, 0), the maximum or within the predefined range under the restrictive condition which includes satisfying the predicted demand amount of hydrogen.

The operation planning model updating portion 412 takes, as an example, the period of M days during the period from the time point t2 to the time point t3, as the virtual target period. Note that, the M days may be a period of, for example, several days or a dozen of days, one or several weeks, one or several months, one or several years, etc. The operation planning model updating portion 412 may perform reinforcement learning, as for the operation plan in the target period based on the operation planning factor in the period before the target period from the time point t2 to the time point t3, in order that the objective function associated with the profit obtained by the hydrogen production system 10 under a restrictive condition should be maximized, using actual hydrogen demand and the practiced performance data of the operation plan in said target period.

Concretely saying, the operation planning model updating portion 412 may calculate the evaluation index in the period of target of learning with an objective function. The operation planning model updating portion 412 may split the period of target of learning into multiple sections, and accordingly perform reinforcement learning of the profit due to an action to be practiced if there was an input (for example, a demand response, a power generation amount and the like) under each status (for example, a status which is different by the hydrogen preservation amount, the hydrogen creation amount and the like) in each section, to thereby update the profit by each action such that the evaluation index should be maximized. By this, the action that should be taken under each status in each section is updated, and the model is updated to the one that can create an appropriate operation plan. The operation planning model updating portion 412 may execute reinforcement learning in multiple periods, displacing the periods of target by one or more sections.

Note that, the target period in each arrangement of the prediction portion 250 may each be a different period, or may be the same period. The target period in each arrangement of the planning portion 260 may each be a different period, or may be the same period. Furthermore, the target periods in the prediction portion 250 and the planning portion 260 may each be a different period, or may be the same periods.

Moreover, the maintenance planning model updating portion 402 and the operation planning model updating portion 412 may, for example, calculate the evaluation index with one objective function for the maintenance plan and the operation plan to perform reinforcement learning of the planning model in order that the value of said evaluation index should be the minimum (for example, 0), the maximum or within the predefined range.

The prediction portion 250 and the planning portion 260 may start adaptive learning to then continue adaptive learning for an initial updating period necessary for updating, and execute the first update of the learning model, and thereafter repeat updating by each fixed period. Here, the initial updating period is preferably the predicted or planned target period or more. Moreover, the fixed period to repeat updating may be several hours, a dozen of hours, one day, tens of hours or several days, etc. Note that, the prediction portion 250 and the planning portion 260 may update the learning model by each different updating period or by the same updating period.

Next, the prediction portion 250 creates the predicted result, using the learning model (S540).

For example, the demand response prediction portion 304 creates the predicted demand response during from the time point t4 to the time point t5, using the updated demand response prediction model and the demand response predictive factor. Note that, the period during from the time point t4 to the time point t5 is the period after period during from the time point t2 to the time point t3, and may be a future period from the time of prediction. The demand response prediction portion 304 applies, as an example, the demand response predictive factor of N days acquired in the initial updating period and/or the demand response predictive factor including the predicted result created by the prediction portion 250 to the demand response prediction model, to thereby create a predicted demand response in N days after the initial updating period. The demand response prediction portion 304 may supply the created predicted demand response to the storage portion 240 for storage.

For example, the operation prediction portion 314 predicts the operation amount of the hydrogen generation apparatus 110 during from the time point t4 to the time point t5, using the updated operation prediction model and the operation predictive factor. Note that, the period from the time point t4 to the time point t5 is the period after the period of the time point t2 to the time point t3, and may be the future period from the time of prediction. The operation prediction portion 314 applies, as an example, the operation predictive factor of N days obtained in the initial updating period and/or the operation predictive factor including the predicted result created by the prediction portion 250 to the operation prediction model, to thereby predict the operation amount in N days after the initial updating period. The operation prediction portion 314 may supply the created predicted operation amount to the storage portion 240 for storage.

For example, the demand prediction portion 324 creates the predicted demand amount of the hydrogen for the hydrogen production system 10 during from the time point t4 to the time point t5, using the updated demand prediction model and the demand predictive factor. The demand prediction portion 324 may predict the predicted demand amount, based on the demand predictive factor including the predicted consumption amount. By this, the demand prediction portion 324 can accurately predict the demand associated with the predicted consumption amount of the hydrogen. The demand prediction portion 324 applies, as an example, the demand predictive factor of N days acquired in the initial updating period and/or the demand predictive factor including the predicted result created by the prediction portion 250 to the demand prediction model, to thereby predict the demand amount in N days after the initial updating period. The demand prediction portion 324 may supply the created predicted demand amount to the storage portion 240 for storage.

For example, the power generation amount prediction portion 334 predicts the power generation amount of the power generation apparatus 100 during from the time point t4 to the time point t5, using the updated power generation amount prediction model and the power generation amount predictive factor. The power generation amount prediction portion 334 applies, as an example, the power generation amount predictive factor of N days acquired in the initial updating period and/or the power generation amount predictive factor including the predicted result created by the prediction portion 250 to the power generation amount prediction model, to thereby predict the power generation amount in N days after the initial updating period. The power generation amount prediction portion 334 may supply the created power generation amount prediction to the storage portion 240 for storage.

For example, the electricity price prediction portion 344 predicts the electricity price during from the time point t4 to the time point t5, using the updated electricity price prediction model and the electricity price predictive factor. The electricity price prediction portion 344 applies, as an example, the electricity price predictive factor of N days acquired in the initial updating period and/or the electricity price predictive factor including the predicted result created by the prediction portion 250 to the electricity price prediction model, to thereby predict the electricity price in N days after the initial updating period. The electricity price prediction portion 344 may supply the created predicted electricity price to the storage portion 240 for storage.

For example, the consumption prediction portion 354 predicts the consumption amount of the hydrogen during from the time point t4 to the time point t5, using the updated consumption prediction model and the consumption predictive factor. The consumption prediction portion 354 applies, as an example, the consumption predictive factor of N days acquired in the initial updating period and/or the consumption predictive factor created by the prediction portion 250 to the consumption prediction model, to thereby predict the consumption amount in N days after the initial updating period. The consumption prediction portion 354 may supply the created predicted consumption amount to the storage portion 240 for storage.

For example, the preservation amount prediction portion 364 predicts the preservation amount of the hydrogen of the hydrogen preservation apparatus 120 during from the time point t4 to the time point t5, using the updated preservation amount prediction model and the preservation amount predictive factor. The preservation amount prediction portion 364 applies, as an example, the preservation amount predictive factor of N days acquired in the initial updating period and/or the preservation amount predictive factor including the predicted result created by the prediction portion 250 to the preservation amount prediction model, to thereby predict the preservation amount in N days after the initial updating period. The preservation amount prediction portion 364 may supply the created predicted preservation amount to the storage portion 240 for storage.

For example, the power storage amount prediction portion 374 creates the predicted power storage amount of the power storage apparatus 130 during from the time point t4 to the time point t5, using the updated power storage amount prediction model and the power storage amount predictive factor. The power storage amount prediction portion 374 applies, as an example, the power storage amount predictive factor of N days acquired in the initial updating period and/or the power storage amount predictive factor including the predicted result created by the prediction portion 250 to the power storage amount prediction model, to thereby predict the power storage amount in N days after the initial updating period. The power storage amount prediction portion 374 may supply the created predicted power storage amount to the storage portion 240 for storage.

For example, the abnormality prediction portion 384 predicts the abnormality of the hydrogen production system 10 during from the time point t4 to the time point t5, using the updated abnormality prediction model and the abnormality predictive factor. The abnormality prediction portion 384 applies, as an example, the abnormality predictive factor of N days acquired in the initial updating period and/or the abnormality predictive factor including the predicted result created by the prediction portion 250 to the abnormality prediction model, to thereby predict the abnormality occurrence in N days after the initial updating period. The abnormality prediction portion 384 may supply the predicted abnormality to the storage portion 240 for storage.

The planning portion 260 creates a plan, using the updated learning model (S550). For example, the maintenance planning portion 404 may apply the maintenance planning factor including the predicted result created by the prediction portion 250 to the updated maintenance planning model, to accordingly create a maintenance plan during from the time point t4 to the time point t5. The maintenance planning portion 404 applies, as an example, the value of the maintenance planning factor of N days acquired in the initial updating period and/or the value of the maintenance planning factor including the predicted result created by the prediction portion 250 to the maintenance planning model, to thereby create the maintenance plan of N days after the initial updating period. The maintenance planning portion 404 may create one maintenance plan for each apparatus, or one maintenance plan for multiple apparatuses, of the hydrogen production system 10.

The maintenance planning portion 404 may create the maintenance plan for the hydrogen production system 10, based on the abnormality predicted by the abnormality prediction portion 384. The maintenance planning portion 404 applies, for example, the abnormality prediction to the maintenance planning model to create a maintenance plan. By this, the maintenance planning portion 404 can create a maintenance plan, in order that the maintenance work should be done before the timing of abnormality occurrence predicted by the abnormality prediction. The maintenance planning portion 404 can create a maintenance plan, with which an increase of cost or effect on the operation of the hydrogen generation apparatus 110 due to the maintenance work is reduced, by means of the maintenance planning model updated by the reinforcement learning in the maintenance planning model updating portion 402.

The operation planning portion 414 may apply the operation planning factor including the predicted result created by the prediction portion 250 to the updated operation planning model, to accordingly create an operation plan for the hydrogen generation apparatus 110 during from the time point t4 to the time point t5. The operation planning portion 414 applies, as an example, the operation planning factor of N days acquired in the initial updating period and/or the operation planning factor including the predicted result created by the prediction portion 250 to the operation planning model, to thereby create the operation plan of N days after the initial updating period.

The operation planning portion 414 may create an operation plan for the hydrogen generation apparatus 110, based on the predicted demand response. The operation planning portion 414 applies, for example, a predicted demand response to the operation planning model, to thereby create an operation plan. If the predicted demand response is to request an inhibition of the power consumption amount in the target period, the operation planning portion 414 may produce the hydrogen with the power bought from the power system in another period among the target periods, with the assumption to follow the demand response, to create the operation plan satisfying the hydrogen demand. Moreover, if the predicted demand response is to request an increase of the power consumption amount in the target period, the operation planning portion 414 may reduce the power amount to buy from the power system in another period among the target periods, with the assumption to follow the demand response, to create the operation plan satisfying the hydrogen demand.

The operation planning portion 414 may create an operation plan that aims to maximize the objective function associated with the profit to be obtained by the hydrogen production system 10, under the restrictive condition including satisfying the predicted demand amount of the hydrogen. The operation planning portion 414 can create an operation plan which maximizes the profit by hydrogen production in the hydrogen production system 10, by using the operation planning model updated by reinforcement learning in the operation planning model updating portion 412.

Note that, if the hydrogen production system 10 comprises multiple hydrogen generation apparatus 110, the operation planning portion 414 may create each operation plan for multiple hydrogen generation apparatuses 110, or one operation plan for multiple hydrogen generation apparatus 110. For example, the operation planning model creation portion 410 may create one operation planning model corresponding to multiple hydrogen generation apparatuses 110, and the operation planning model updating portion 412 may update said one operation planning model by reinforcement learning. In this case, the operation planning model may be a model for creating an operation plan for associatedly operating multiple hydrogen generation apparatuses 110, and as an example, may be a model for creating an operation plan of which the timing of operation start and the operating period, etc. of each of the multiple hydrogen generation apparatus 110 are optimized.

Next, the control portion 220 controls each apparatus of the hydrogen production system 10, following the planning data created by the planning apparatus 200 (S560). The control portion 220 of the control apparatus 140 may transmit the command in line with the planning data created by the planning apparatus 200 to each apparatus of the hydrogen production system 10 to control it. Moreover, the control portion 220 may output the planning data to one or more terminal apparatus and the like of an operator who conducts maintenance or administration of the hydrogen production system 10.

Next, in S570, if the operation of the hydrogen generation apparatus 110 continues, the control apparatus 140 continues to control each apparatus of the hydrogen production system 10, and further continues to learn the model from S530 to update it to a more efficient model.

Figure 6:
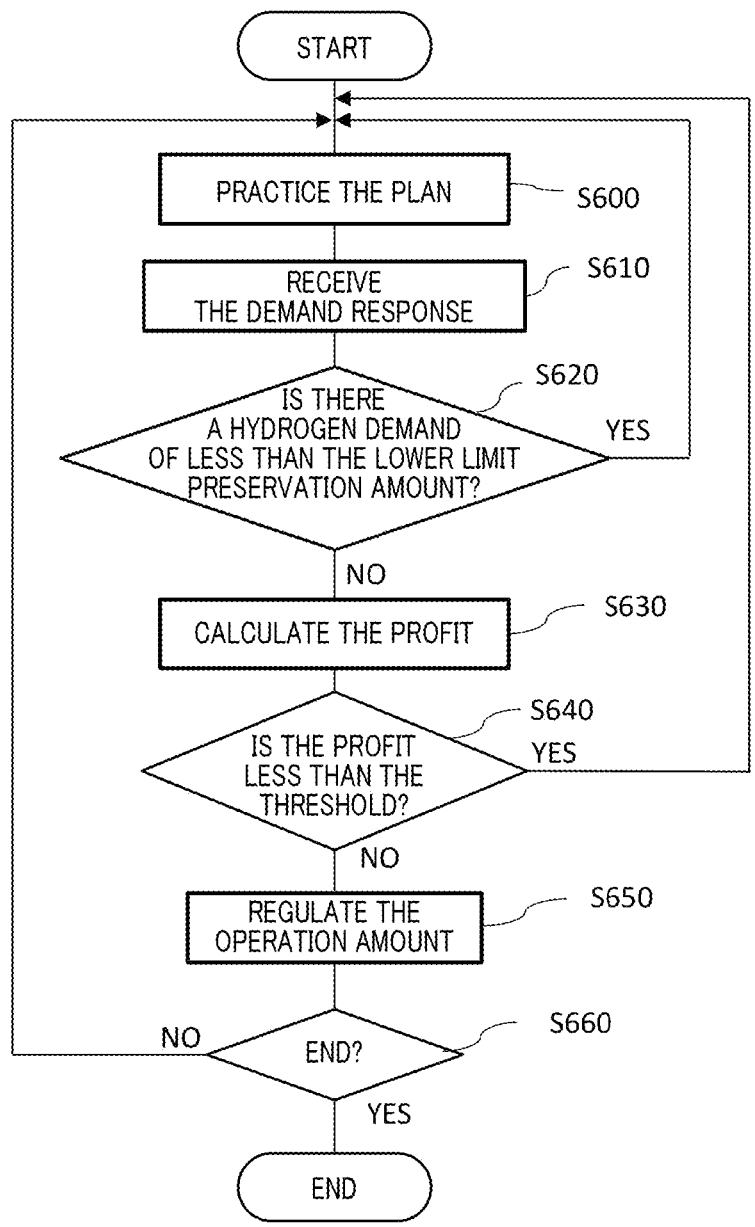
FIG. 6 shows the control flow of the control apparatus 140 of this embodiment.

FIG. 6 shows the control flow of the control apparatus 140 of this embodiment. FIG. 6 is a more detailed flow of carrying out the plan in S560 in FIG. 5.

In S600, the control portion 220 receives the maintenance plan and the operation plan, and controls each apparatus of the hydrogen production system 10 following the plans.

In S610, the acquisition portion 230 acquires the demand response from the power operator 20, and store it in the storage portion 240. The control portion 220 may receive the demand response from the storage portion 240 to accordingly acquire, in response to the receipt, the operation state of the hydrogen production system 10 from each apparatus or the storage portion 240.

In S620, the control portion 220 determines, from the acquired operation state, whether or not the preservation amount of the hydrogen in the hydrogen preservation apparatus 120 comprised by the hydrogen production system 10 is equal to or less than the lower limit preservation amount as well as there is a demand for hydrogen to be addressed by operating the hydrogen generation apparatus 110 by the power from the power system. If YES, once a demand response requesting an inhibition of the power consumption amount is acquired in S610, in response the phase moves to S600, and the hydrogen generation apparatus 110 is operated by the power from the power system, not following the acquired demand response. If NO, the phase moves to S630. The control portion 220 determines whether there is a demand for hydrogen to be addressed by operating the hydrogen generation apparatus 110 by a power from the power system, for example, from at least one of the operation plan being practiced, the current power generation amount of the power generation apparatus 100, the power storage apparatus 130 and the demand amount of the hydrogen (or the predicted demand amount of the hydrogen)

In S630, the calculation portion 210 calculates the profit to be obtained from regulating the operation amount of the hydrogen generation apparatus 110 following the acquired demand response, based on the demand response received from the storage portion 240 and the operation plan received from the planning portion 260. The calculation portion 210 may further receive the operation state of the hydrogen production system 10, information of each apparatus of the hydrogen production system 10, etc., to use them for calculating the profit, from the storage portion 240.

As an example, where the demand response is to request an inhibition of the power consumption amount, the calculation portion 210 may determine whether the demand amount of the hydrogen can be satisfied when said demand response is followed, and if it cannot be satisfied, to calculate the profit to a lower one (for example, 0). As an example, where the demand response is to request an increase of the power consumption amount, the calculation portion 210 may calculate the profit from at least one of the profit from following the demand response, the power buying price from the power system, the preservation amount of the hydrogen and the price of the hydrogen.

For example, when a preservation amount of the hydrogen in the hydrogen preservation apparatus 120 comprised by the hydrogen production system 10 is equal to or more than the upper limit preservation amount, the calculation portion 210 increases the operation amount of the hydrogen generation apparatus 110 following the acquired demand response, in response to the acquisition of the demand response requesting an increase of the power consumption amount, to accordingly calculate the profit to be obtained by means of discharging surplus hydrogen. Like this, even if the produced hydrogen is to be simply discharged without being preserved, the calculation portion 210 can calculate the profit taking the incentive to be received from the power operator 20 by following the demand response and the cost of resumption of operation of the hydrogen generation apparatus 110 into consideration.

Note that, the calculation portion 210 may calculate the profit due to partially following the request of the demand response (as an example, increasing (inhibiting) the power amount of n % (0<n<100) among the requested power increase (inhibition) volume). The calculation portion 210 may calculate the profit of some cases, such as the profit due to partially following the request of the demand response like this, and the profit due to following the request of the demand response to totally satisfying it. Moreover, the calculation portion 210 may calculate the profit due to not following the demand response.

The calculation portion 210 outputs the calculated profit to the control portion 220.

In S640, the control portion 220 determines whether the profit calculated by the calculation portion 210 is equal to or more than the threshold. The phase of the control portion 220 moves to S650 on the condition that the calculated profit is determined to be equal to or more than the threshold (case of YES). The phase of the control portion 220 moves to S600 on the condition that the calculated profit is less than the threshold (case of NO), and keeps the operation amount of the hydrogen generation apparatus 110 associated with the operation plan.

In S650, the control portion 220 controls each apparatus of the hydrogen production system 10 in order that it regulates the operation amount of the hydrogen generation apparatus 110 following the acquired demand response. The control portion 220 may increase the operation amount of the hydrogen generation apparatus 110 if the demand response is to request an increase of the power consumption amount, and lower the operation amount of the hydrogen generation apparatus 110 if the demand response is to request an inhibition of the power consumption amount.

In S660, when the addressing period of the demand response ends, the phase of the control portion 220 moves to S600, if the operation of the hydrogen generation apparatus 110 is to be continued. Moreover, the control portion 220 terminates the control of the hydrogen production system 10, if the target period of the operation plan ends or if new operation plan is not received.

The control apparatus 140 of this embodiment can appropriately address against the demand response issued during the operation of the hydrogen generation apparatus 110 following the operation plan, taking the hydrogen production cost in consideration.

Note that, the control apparatus 140 may not have the calculation portion 210. In this case, the control portion 220 of the control apparatus 140 may regulate the operation amount of the hydrogen generation apparatus 110 associated with the operation plan following the acquired demand response, in response to acquisition of the demand response during when the hydrogen production system 10 is controlled following the operation plan. Also when the demand response is followed unconditionally, the control apparatus 140 of this embodiment can control the hydrogen generation apparatus 110 by means of the operation plan created in response to the demand response in the planning portion 260, to accordingly create the hydrogen at low cost, satisfying the hydrogen demand.

Note that, the planning apparatus 200 may create the operation plan for an apparatus other than the hydrogen generation apparatus 110 of the hydrogen production system 10. In this case, the control portion 220 may control the apparatus of target following said operation plan. Moreover, the hydrogen production system 10 may not include at least one arrangement. Furthermore, in this embodiment, the performance or the performance value may include the same type of data with the predictive factor. Moreover, the hydrogen production system 10 may not have a power generation apparatus 100, and a power may be supplied to the hydrogen generation apparatus 110 from an external power generation apparatus.

Various embodiments of this invention may be described referring to a flowchart and a block diagram, and here, a block may represent (1) a step of a process where a manipulation is executed, or (2) a section of an apparatus that has a role to execute a manipulation. Specific step or section may be implemented by a dedicated circuit, a programmable circuit supplied along with a computer-readable instruction stored in a computer-readable medium, and/or a processor supplied along with a computer-readable instruction stored in a computer-readable medium. A dedicated circuit may include a digital and/or analog hardware circuit, and may include an integrated circuit (IC) and/or a discrete circuit. A programmable circuit may include a reconfigurable hardware circuit including a memory element or the like including a logical AND, a logical OR, a logical XOR, a logical NAND, a logical NOR, and other logical operations, a flip-flop, a register, a field programmable gate array (FPGA), a programmable logic array (PLA) and the like.

A computer-readable medium may include any tangible device which is storable of an instruction to be executed by an appropriate device, as a result of which the computer-readable medium having an instruction stored therein becomes to comprise a product including an instruction that can be executed so as to prepare a means for executing the manipulation designated in a flowchart or a block diagram. As an example of a computer-readable medium, an electronic storage medium, a magnetic storage medium, an optical storage medium, an electromagnetic storage medium, a semiconductor storage medium or the like may be included. As a more concrete example of a computer-readable medium, a Floppy (registered trademark) disk, a diskette, a hard disk, a random access memory (RAM), a read-only memory (ROM), an erasable programmable read-only memory (EPROM or flash memory), an electrically erasable programmable read-only memory (EEPROM), a static random access memory (SRAM), a compact click read-only memory (CD-ROM), a digital versatile disk (DVD), a Blu-ray (registered trademark) (RTM) disk, a memory stick, an integrated circuit card or the like may be included.

A computer-readable instruction may include either one of a source code or an object code, described with any combination of one or more programming language, including an assembler instruction, an instruction set architecture (ISA) instruction, a machine instruction, a machine dependent instruction, a microcode, a firmware instruction, a state-setting data, or an object-oriented programming language like Smalltalk (registered trademark), a JAVA (registered trademark), an object-oriented programming language such as C++ and the like, Python (registered trademark), and a conventional procedural programming language such as "C" programming language or similar programming language.

A computer-readable instruction may execute a computer-readable instruction, in order to prepare a means for executing a manipulation provided locally or via a local area network (LAN), a wide area network (WAN) such as the Internet to a general purpose computer, a specific purpose computer, or other processor or a programmable circuit of a programmable data processing apparatus and specified by a flowchart or a block diagram. As an example of a processor, a computer processor, a processing unit, a microprocessor, a digital signal processor, a controller, a microcontroller and the like are included.

Figure 7:
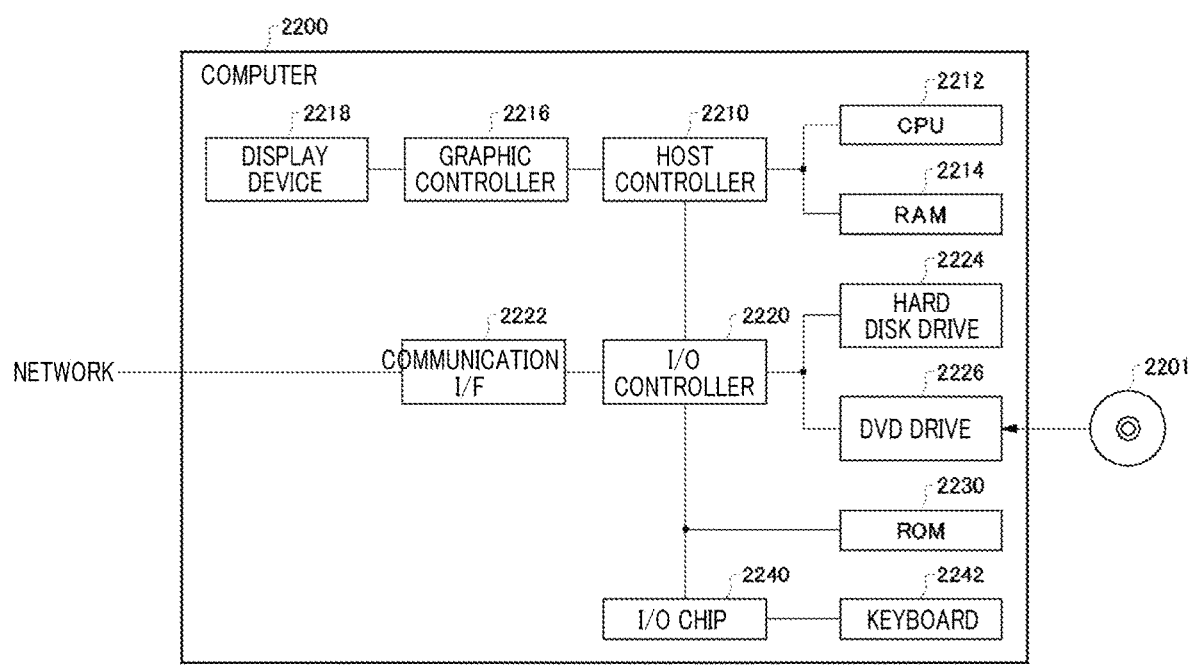
FIG. 7 shows an example of the computer 2200 by which multiple aspects of this embodiment can be entirely or partially embodied.

FIG. 7 shows an example of the computer 2200 by which multiple embodiments of this invention may be entirely or partially embodied. The program installed to the computer 2200 can cause the computer 2200 function as a manipulation related to the apparatus according to an embodiment of this invention or one or more sections of said apparatus, or can cause it execute said manipulation or said one or more sections, and/or can cause the computer 2200 execute a process or a step of said process according to an embodiment of this invention. Such program may be executed by a graphic controller 2216 like a CPU 2212 and/or a GPU in order to cause the computer 2200 execute specific manipulation related to some or all of the flowcharts and block diagrams described in this specification.

The computer 2200 includes a CPU 2212, a RAM 2214, a graphic controller 2216 and a display device 2218, and they are mutually connected by means of a host controller 2210. The computer 2200 also includes a communication interface 2222, a hard disk drive 2224, a DVD-ROM drive 2226, and an input/output unit such as an IC card drive, and they are connected to the host controller 2210 via the input/output controller 2220. The computer 2200 also includes a legacy input/output unit like a ROM 2230 or a keyboard 2242, and they are connected to the input/output controller 2220 via the input/output chip 2240.

The CPU 2212 behaves pursuant to a program stored inside the ROM 2230 and the RAM 2214 to thereby controls each unit. The graphic controller 2216 acquires the image data, created by the CPU 2212, inside a frame buffer, etc. provided inside the RAM 2214 or in itself, and cause the image data to be displayed on the display device 2218.

The communication interface 2222 communicates with other electronic devices via the network. The hard disk drive 2224 stores programs and data to be used by the CPU 2212 inside the computer 2200. The DVD-ROM drive 2226 reads a program or data from the DVD-ROM 2201, and provides the program or data to the hard disk drive 2224 via the RAM 2214. The IC card drive reads a program and data from an IC card, and/or writes a program and data to the IC card.

The ROM 2230 stores, in itself, a boot program, etc., to be executed by the computer 2200 at the time of activation, and/or a program dependent on a hardware of the computer 2200. The input/output chip 2240 may also connect various input/output units to the input/output controller 2220 via a parallel port, a serial port, a keyboard port, a mouse port and the like.

A program is provided by a computer-readable medium like the DVD-ROM 2201 or the IC card. The program is read from a computer-readable medium, installed to the hard disk drive 2224, the RAM 2214 or the ROM 2230, which are examples of a computer-readable medium, and executed by the CPU 2212. Information processing described in these programs are read by the computer 2200, and leads to an association between the program and the above-described various types of hardware resources. An apparatus or a method may be configured by means of realizing a manipulation or a processing, in accordance with the use of the computer 2200.

For example, if communication is executed between the computer 2200 and an external device, the CPU 2212 may execute a communication program loaded in the RAM 2214, to instruct a communication processing to the communication interface 2222 based on the processing described in the communication program. The communication interface 2222 reads, under the control by the CPU 2212, the transmission data stored in a transmission buffer processing area to be provided into a recording medium such as a RAM 2214, a hard disk drive 2224, a DVD-ROM 2201 or an IC card, and transmit the read transmission data to the network, or writes the received data received from the network to the reception buffer processing area provided in the recording medium.

In addition, the CPU 2212 may cause all or necessary part of the file or the database stored in the external recording medium such as a hard disk drive 2224, a DVD-ROM drive 2226 (DVD-ROM 2201), and an IC card read by a RAM 2214, to execute various types of processing to the data in the RAM 2214. Next, the CPU 2212 writes back the processed data to an external recording medium.

Various types of program, data, table, and various types of information such as a database may be stored in the recording medium to receive information processing. The CPU 2212 may execute, against the data read from the RAM 2214, various types of processing including various types of manipulation, information processing, condition determination, conditional branch, unconditional branch, information search/replacement, etc., which are described in elsewhere in this disclosure and specified by the instruction sequence of a program, and writes back the result to the RAM 2214. In addition, the CPU 2212 may search information in the files of a recording medium, a database, etc. For example, if multiple entries, each having the attribute value of the first attribute associated with the attribute value of the second attribute, are stored in the recording medium, the CPU 2212 may search, from among said multiple entries, the entry matching with the condition, in which the attribute value of the first attribute is specified, and then read the attribute value of the second attribute stored in said entries, to thereby acquire the attribute value of the second attribute associated with the first attribute that satisfies the predefined condition.

The above-described program or software module may be stored in a computer-readable medium in the computer 2200 or in proximity to the computer 2200. Moreover, a recording medium, such as a hard disk or a RAM, which is provided in a server system connected to a dedicated communication network, or the Internet, for example a cloud server or the like, can be used as a computer-readable medium, to thereby provide the program to the computer 2200 via the network.

While the embodiments of the present invention have been described, the technical scope of the invention is not limited to the above-described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

EXPLANATION OF REFERENCES

Hydrogen production system; 20 Power operator; 100 Power generation apparatus; 110 Hydrogen generation apparatus; 120 Hydrogen preservation apparatus; 130 Power storage apparatus; 140 Control apparatus; 200 Planning apparatus; 210 Calculation portion; 220 Control portion; 230 Acquisition portion; 240 Storage portion; 250 Prediction portion; 260 Planning portion; 300 Demand response prediction model creation portion; 302 Demand response prediction model updating portion; 304 Demand response prediction portion; 310 Operation prediction model creation portion; 312 Operation prediction model updating portion; 314 Operation prediction portion; 320 Demand prediction model creation portion; 322 Demand prediction model updating portion; 324 Demand prediction portion; 330 Power generation amount prediction model creation portion; 332 Power generation amount prediction model updating portion; 334 Power generation amount prediction portion; 340 Electricity price prediction model creation portion; 342 Electricity price prediction model updating portion; 344 Electricity price prediction portion; 350 Consumption prediction model creation portion; 352 Consumption prediction model updating portion; 354 Consumption prediction portion; 360 Preservation amount prediction model creation portion; 362 Preservation amount prediction model updating portion; 364 Preservation amount prediction portion; 370 Power storage amount prediction model creation portion; 372 Power storage amount prediction model updating portion; 374 Power storage amount prediction portion; 380 Abnormality prediction model creation portion; 382 Abnormality prediction model updating portion; 384 Abnormality prediction portion; 400 Maintenance planning model creation portion; 402 Maintenance planning model updating portion; 404 Maintenance planning portion; 410 Operation planning model creation portion; 412 Operation planning model updating portion; 414 Operation planning portion; 2200 Computer; 2201 DVD-ROM; 2210 Host controller; 2212 CPU; 2214 RAM; 2216 Graphic controller; 2218 Display device; 2220 Input/output controller; 2222 Communication interface; 2224 Hard disk drive; 2226 DVD-ROM drive 2230 ROM; 2240 Input/output chip 2242 Keyboard

What is claimed is:

1. A planning apparatus for creating an operation plan for a hydrogen production system including a hydrogen generation apparatus, comprising:
    at least one processor;
    an acquisition portion that uses the at least one processor to acquire a demand response from a power operator;
    an operation planning portion that uses the at least one processor to create the operation plan based on the demand response before a target period of the operation plan and at least one of an electricity price, a demand amount of hydrogen and an amount of stored hydrogen before the target period;
    a demand response prediction portion that uses the at least one processor to create a predicted demand response to be received from the power operator during the target period by using a demand response prediction model, wherein the operation planning portion uses the at least one processor to create the operation plan based on the predicted demand response; and
    wherein the demand response prediction model uses the at least one processor to predict the predicted demand response based on, a demand response predictive factor including at least one of, a performance of a demand response, an electricity price, weather information, a power generation amount, a demand amount of hydrogen and a power demand amount before the target period, and a predicted power generation amount, a predicted demand amount of hydrogen and a predicted power demand amount in the target period; and
    a demand response prediction model updating portion uses the at least one processor to update the demand response prediction model by means of learning, using a performance of acquired demand response;
    wherein
    the hydrogen production system further comprises a power storage apparatus configured to accumulate at least a part of surplus power, that is not used by the hydrogen generation apparatus among the power created by a power generation apparatus of the hydrogen production system, for making the power storage apparatus capable of supplying power to the hydrogen generation apparatus thereafter;
    the planning apparatus further comprises a power storage amount prediction portion that uses the at least one processor to create a predicted power storage amount of the power storage apparatus using a power storage amount prediction model; and
    the operation planning portion uses the at least one processor to create the operation plan based on the predicted power storage amount.

2. The planning apparatus according to claim 1, further comprising
    an electricity price prediction portion that uses the at least one processor to create a predicted electricity price using an electricity price prediction model, wherein
    the operation planning portion uses the at least one processor to create the operation plan further based on the predicted electricity price.

3. The planning apparatus according to claim 1, further comprising
    a preservation amount prediction portion that uses the at least one processor to create a predicted amount of stored hydrogen in a hydrogen preservation apparatus of the hydrogen production system using a preservation amount prediction model, wherein
    the operation planning portion uses the at least one processor to create the operation plan further based on the predicted preservation amount.

4. The planning apparatus according to claim 2, further comprising
    a preservation amount prediction portion that uses the at least one processor to create a predicted amount of stored hydrogen in a hydrogen preservation apparatus of the hydrogen production system using a preservation amount prediction model, wherein
    the operation planning portion uses the at least one processor to create the operation plan further based on the predicted preservation amount.

5. The planning apparatus according to claim 3, further comprising
    an operation prediction portion that uses the at least one processor to create a predicted operation amount of the hydrogen generation apparatus using an operation prediction model, wherein
    the preservation amount prediction model uses the at least one processor to predict a predicted amount of stored hydrogen by the hydrogen preservation apparatus in the target period, based on a preservation amount predictive factor including the predicted operation amount.

6. The planning apparatus according to claim 1, wherein:
    the hydrogen production system uses the at least one processor to receive power from a power generation apparatus for creating power using renewable energy;
    the planning apparatus further comprises a power generation amount prediction portion that uses the at least one processor to create a predicted power generation amount of the power generation apparatus using a power generation amount prediction model; and
    the operation planning portion uses the at least one processor to create the operation plan further based on the predicted power generation amount.

7. The planning apparatus according to claim 2, wherein:
    the hydrogen production system uses the at least one processor to receive power from a power generation apparatus for creating power using renewable energy;
    the planning apparatus further comprises a power generation amount prediction portion that uses the at least one processor to create a predicted power generation amount of the power generation apparatus using a power generation amount prediction model; and
    the operation planning portion uses the at least one processor to create the operation plan further based on the predicted power generation amount.

8. The planning apparatus according to claim 1, comprising:
    an abnormality prediction portion that uses the at least one processor to predict to an abnormality of the hydrogen production system, using an abnormality prediction model for predicting abnormality occurrence of the hydrogen production system based on an operation state of the hydrogen production system; and a maintenance planning portion that uses the at least one processor to create a maintenance plan for the hydrogen production system based on the abnormality prediction, wherein the fning portion uses the at least one processor to create the operation plan further based on the maintenance plan.

9. The planning apparatus according to claim 2, comprising:

an abnormality prediction portion that uses the at least one processor to predict an abnormality of the hydrogen production system, using an abnormality prediction model for predicting abnormality occurrence of the hydrogen production system based on an operation state of the hydrogen production system; and a maintenance planning portion that uses the at least one processor to create a maintenance plan for the hydrogen production system based on the abnormality prediction, wherein the operation planning portion uses the at least one processor to create the operation plan further based on the maintenance plan.

10. The planning apparatus according to claim 1, further comprising a demand prediction portion that uses the at least one processor to create a predicted demand amount of hydrogen using a demand prediction model, wherein the operation planning portion uses the at least one processor to create the operation plan further based on the predicted demand amount; and a consumption prediction portion that uses the at least one processor to create a predicted consumption amount of hydrogen using a consumption prediction model, wherein the demand prediction portion uses the at least one processor to predict the predicted demand amount based on a demand predictive factor including the predicted consumption amount.

11. The planning apparatus according to claim 2, further comprising a demand prediction portion that uses the at least one processor to create a predicted demand amount of hydrogen using a demand prediction model, wherein the operation planning portion uses the at least one processor to create the operation plan further based on the predicted demand amount; and a consumption prediction portion that uses the at least one processor to create a predicted consumption amount of hydrogen using a consumption prediction model, wherein the demand prediction portion uses the at least one processor to predict the predicted demand amount based on a demand predictive factor including the predicted consumption amount.

12. The planning apparatus according to claim 10, wherein the operation planning portion uses the at least one processor to create the operation plan aimed for maximization of an objective function associated with a profit obtained by the hydrogen production system under a restrictive condition including satisfying the predicted demand amount of hydrogen.

13. A control apparatus, comprising:

a planning apparatus according to claim 1; and a control portion that uses the at least one processor to control a hydrogen production system following an operation plan, wherein the control portion uses the at least one processor to regulate an operation amount of the hydrogen generation apparatus associated with the operation plan, following an acquired demand response, in response to acquisition of the demand response during when the hydrogen production system is controlled following the operation plan.

14. A control apparatus, comprising:

a planning apparatus according to claim 2; and a control portion that uses the at least one processor to control a hydrogen production system following an operation plan, wherein the control portion uses the at least one processor to regulate an operation amount of the hydrogen generation apparatus associated with the operation plan, following an acquired demand response, in response to acquisition of the demand response during when the hydrogen production system is controlled following the operation plan.

15. The control apparatus according to claim 13, further comprising a calculation portion that uses the at least one processor to calculate a profit obtained by regulating operation amount of the hydrogen generation apparatus following an acquired demand response, wherein the control portion uses the at least one processor to regulate an operation amount of the hydrogen generation apparatus associated with the operation plan, following the acquired demand response, under a condition that the calculated profit is equal to or more than a threshold; and the control portion uses the at least one processor to keep an operation amount of the hydrogen generation apparatus associated with the operation plan, under a condition that the calculated profit is less than a threshold.

16. The control apparatus according to claim 15, wherein:

the calculation portion uses the at least one processor to, when an amount of stored hydrogen in a hydrogen preservation apparatus included in the hydrogen production system is equal to or more than an upper limit preservation amount, increase the operation amount of the hydrogen generation apparatus following the acquired demand response, in response to acquisition of the demand response requesting an increase of power consumption amount, to accordingly calculate a profit to be obtained by means of discharging surplus hydrogen; and the control portion uses the at least one processor to, when the amount of stored hydrogen in a hydrogen preservation apparatus included by the hydrogen production system is equal to or less than a lower limit preservation amount and also when there is a demand for hydrogen to be addressed by operating the hydrogen generation apparatus by a power from a power system, operate the hydrogen generation apparatus by the power from the power system not following the acquired demand response, in response to the acquisition of the demand response requesting an inhibition of a power consumption amount.

17. A control apparatus for controlling a hydrogen production system including a hydrogen generation apparatus following an operation plan, comprising:
- at least one processor;
- an acquisition portion that uses the at least one processor to acquire a demand response from a power operator;
- an operation planning portion that uses the at least one processor to create the operation plan based on at least one of the demand response, an electricity price, a demand amount of hydrogen and an amount of stored hydrogen, before a target period of the operation plan;
- a control portion that uses the at least one processor to control the hydrogen production system following the operation plan; and
- a calculation portion that uses the at least one processor to calculate a profit obtained by regulating operation amount of the hydrogen generation apparatus following an acquired demand response, wherein
- the control portion uses the at least one processor to regulate an operation amount of the hydrogen generation apparatus associated with the operation plan, following the acquired demand response, under a condition that the calculated profit is equal to or more than a threshold; and
- the control portion uses the at least one processor to keep an operation amount of the hydrogen generation apparatus associated with the operation plan, under a condition that the calculated profit is less than a threshold.

18. A method for controlling a hydrogen production system comprising a hydrogen generation apparatus following an operation plan, comprising:
- acquiring demand response from a power operator;
- creating the operation plan based on at least one of the demand response, electricity price, demand amount of hydrogen and amount of stored hydrogen, before a target period of the operation plan; and
- controlling the hydrogen production system following the operation plan; and
- calculating a profit obtained by regulating operation amount of the hydrogen generation apparatus following an acquired demand response, wherein
- the controlling includes regulating an operation amount of the hydrogen generation apparatus associated with the operation plan, following the acquired demand response, under a condition that the calculated profit is equal to or more than a threshold; and
- the controlling includes keeping an operation amount of the hydrogen generation apparatus associated with the operation plan, under a condition that the calculated profit is less than a threshold.

19. A non-transitory recording medium with a program recorded therein that, when executed by a computer having at least one processor, causes the computer to function as a control apparatus for controlling a hydrogen production system including a hydrogen generation apparatus following an operation plan, comprising:
- an acquisition portion for acquiring a demand response from a power operator;
- an operation planning portion for creating the operation plan based on at least one of the demand response, an electricity price, a demand amount of hydrogen, an amount of stored hydrogen, and a predicted power storage amount, before a target period of the operation plan;
- a control portion for controlling the hydrogen production system following the operation plan; and
- a calculation portion that uses the at least one processor to calculate a profit obtained by regulating operation amount of the hydrogen generation apparatus following an acquired demand response, wherein
- the control portion uses the at least one processor to regulate an operation amount of the hydrogen generation apparatus associated with the operation plan, following the acquired demand response, under a condition that the calculated profit is equal to or more than a threshold; and
- the control portion uses the at least one processor to keep an operation amount of the hydrogen generation apparatus associated with the operation plan, under a condition that the calculated profit is less than a threshold.

* * * * *